United States Patent [19]

Outou et al.

[11] Patent Number: 4,925,127
[45] Date of Patent: May 15, 1990

[54] FF-REW CHANGING MECHANISM FOR TAPE RECORDING AND/OR REPRODUCING APPARATUS

[75] Inventors: Tatsuyuki Outou; Hisanori Watanabe, both of Kanagawa, Japan

[73] Assignee: Sony Corporation, Tokyo, Japan

[21] Appl. No.: 201,435

[22] Filed: Jun. 2, 1988

[30] Foreign Application Priority Data

Jun. 30, 1987 [JP] Japan .................................. 62-163354

[51] Int. Cl.⁵ ........................ G11B 15/18; G11B 19/00
[52] U.S. Cl. ..................................... 242/201; 360/96.3
[58] Field of Search ............... 242/201, 204, 206, 208; 360/96.3, 96.4, 96.1

[56] References Cited

U.S. PATENT DOCUMENTS 4,708,302 11/1987 Yamaguchi et al. ................. 360/963
4,760,751 8/1988 Kasamatsu ....................... 242/201 X Primary Examiner—Stanley N. Gilreath
Attorney, Agent, or Firm—Lewis H. Eslinger; Jay H. Maioli

[57] ABSTRACT

In a drive mechanism for driving tape recorder reel bases wherein a mode-change lever is operated to change modes and a drive gear rotatably mounted to the change lever selectively engages one of the pair of reel bases, a reciprocating brake member in provided that is capable of engaging the reel bases in a return position to lock the reel bases. Further engagement portions for engaging the brake member with the change lever are provided, so that the drive gear engages one of the reel bases only after the brake member has been disengaged from the pair of reel bases and, on the other hand, the brake member engages the pair of reel bases only after the drive gear has been disengaged from the one of the reel bases.

11 Claims, 23 Drawing Sheets

FIG.5

FF-REW CHANGING MECHANISM FOR TAPE RECORDING AND/OR REPRODUCING APPARATUS

BACKGROUND OF THE INVENTION

1. Field of the Invention

This invention relates generally to a mechanism for driving the two reel bases of a tape recorder and, more particularly, to such mechanism in which a driver selectively engages one of the reel bases by swinging or pivotting a change lever in a predetermined direction.

2. Description of the Background

Drive systems for the reel bases of a tape recorder are known in which a driver element, such as a gear, is rotatably secured to a change lever, so that when the change lever is moved in a predetermined direction, for example, to obtain a fast forward mode or a rewind mode, the driver element selectively engages and rotates one of the two reel bases. It is also known that in a tape recorder or the like a brake member is provided to lock the pair of reel bases from rotation, in order to prevent the tape from becoming slack when selecting the stop mode or during some other mode changing operation due to continued rotation of the reel bases. Nevertheless, if the mechanism for selectively engaging the driver to rotate one of the reel bases and the brake member for locking the pair of reels are provided in the tape recorder without being mutually connected so as to be coordinated with each other, it will frequently be the case that both operations do not occur in synchronism, so that noises are apt to be produced when the driver is engaged with, or disengaged from, a reel base. That is, if the driver engages the reel base before the reel base has been fully disengaged from the brake member so as to render it freely rotatable, the rotating driver will be forced to engage a locked reel base, so that relatively loud and alarming noises are produced. On the other hand, if the reel bases are locked by the brake member before the driver has become fully disengaged from a reel base, the brake member will be forced to attempt to lock a rotating reel base, so that those unacceptable noises will also be produced.

It is also known that in a tape recorder mode-change mechanism a change lever for changing modes can be driven by a cam to obtain a fast forward mode or a rewind mode. In such cases, the change lever is urged toward the cam by a specially provided spring so as to ensure that the change lever will be positively driven by the cam. This special spring increases the number of parts in the tape recorder, increases the steps required for the assembly, and makes the overall construction more complicated.

OBJECTS AND SUMMARY OF THE INVENTION

Accordingly, it is an object of the present invention to provide a fast forward and reverse mode changing mechanism for a tape recording and reproducing apparatus that can eliminate the above-noted defects inherent in the prior art.

Another object of the present invention is to provide a drive device for the reel bases of a tape recorder in which a change lever for engaging a driver with one of the two reel bases and a brake member for locking the pair of reel bases are provided with respective engagement portions that engage with each other, so that the driver positively cooperate the reel base only after the reel bases are free to rotate and, conversely, the reel bases are positively locked only after the driver has been disengaged from the reel base.

A further object of the present invention is to provide a drive mechanism for tape recorder reel bases in which a change lever for engaging a driver with one of a pair of reel bases is mounted in conjunction with a brake member for locking the pair of reel bases, whereby both activate with a fixed time relationship, so that no noise is produced when a driver is engaged with or disengaged from a reel base.

Still another object of the present invention is to provide a drive mechanism for tape recorder reel bases in which a change lever for engaging a driver with one of a pair of reel bases is securely held in its neutral position, in which the driver is not engaged with either of the pair of reel bases, so that a mode-change mechanism is prevented from changing to, for example, a fast forward mode or a rewind mode, or from interfering with the change lever, and a brake member for locking the pair of reel bases can not be moved to its return position while the change lever is actuated, so that the reel bases can never be locked while rotating.

Yet a further object of the present invention is to provide a drive mechanism for tape recorder reel bases in which a cantilever-type spring protrudes into a location of a cam where a first and second passage branch, and a change lever for causing a driver to engage one of a pair of reel bases is selectively guided to one of the first and second passages, so that the change lever is driven only by the cantilever-type spring, and no other specially provided spring for urging the change lever is required. Therefore, the number of parts and the steps required for the assembly are reduced and, in addition, the overall construction is simplified.

Still another object of the present invention is to provide a drive mechanism for tape recorder reel bases in which a change lever for engaging a driver with one of the reel bases is resiliently pressed against a mode-change cam by a force provided by the elastic belt that is looped between a motor pulley and a driven pulley, so that there is no need for a special spring for urging the change lever against the cam. Thus, the number of parts and steps required for the assembly are reduced and the construction is simplified.

In accordance with an aspect of the present invention a drive and mode-change mechanism is provided for an auto-reverse tape recorder in which, during a mode-changing operation, the reel bases of the recorder are prevented from being locked while they are still turning and, on the other hand, they are prevented from being driven until they are completely unlocked. This is accomplished by providing a drive mechanism and locking mechanism that are connected for cooperation and synchronism, which mechanisms require only a single solenoid for use in performing the desired mode changing operations. The mode changing mechanism includes a change lever that is pivotally mounted and that has a driver rotatably mounted thereon. By movement of the change lever the driver transmits torque from the tape recorder drive motor to one of the reel bases. A controller is provided to either permit the change lever to pivot or to retain it in a fixed position in response to selected ones of the different mode change operations. A mode change cam arrangement is provided that has a first cam passage and a second cam passage. Upon rotation of the mode change cam, the mode change lever is directed by the first cam passage to a first mode position and upon continued rotation to a second cam position. A single spring is arranged on the mode change cam arrangement at a position where the first and second cam passages branch off. The spring acts to make the change lever select one or the other of the two cam passages. By use of these mechanisms when a first mode is selected the controller places the change lever in a state in which it can pivot so that the changer lever is forced by the spring to enter the first cam passage as the mode change cam rotates. Then, when the second mode is selected the mode change lever is set to a fixed, non-pivoting, state by the controller. The change lever is then led against the force of the spring down the second cam passage as the mode change cam rotates. The controller for the change lever includes a reciprocally mounted brake that engages the pair of reel brakes and prevents rotation. Operation of the brake is controlled in response to the change of mode of the tape recorder by a brake controller, so that when the brake engages the reel bases to prevent rotation the change lever is prevented from pivoting and when the brake is released and the reel bases can move, the change lever is also free to move. The change lever controller consists of a mating tab and slot arrangement on the change lever and brake, respectively, with engagement between the tab and slot being a function of the movement of the brake. A specially formed gear that has toothless portions at various locations on the periphery is intermittently rotated by the driving gear of the tape recorder motor in response to selected mode changes. The mode change cam is formed on the flat surface of this gear. The driving gear is arranged relative to the partially toothless gear so that during rotation of the partially toothless gear the driving gear will be adjacent the toothless portions. A solenoid driven brake controller controls a regulator for locking and unlocking the rotation of the partially toothless gear at a time when each of the toothless portions is opposite the driving gear.

The above and other objects, features, and advantages of the present invention will become apparent from the following detailed description of an illustrative embodiment of the invention that is to be read in connection with the accompanying drawings, in which like reference numerals represent the same or similar elements.

BRIEF DESCRIPTION OF THE DRAWINGS

FIG. 5 is an exploded, bottom, perspective view of the mode-change mechanism of the auto-reverse tape recorder of FIG. 1;

DETAILED DESCRIPTION OF THE PREFERRED EMBODIMENT

Figure 1:
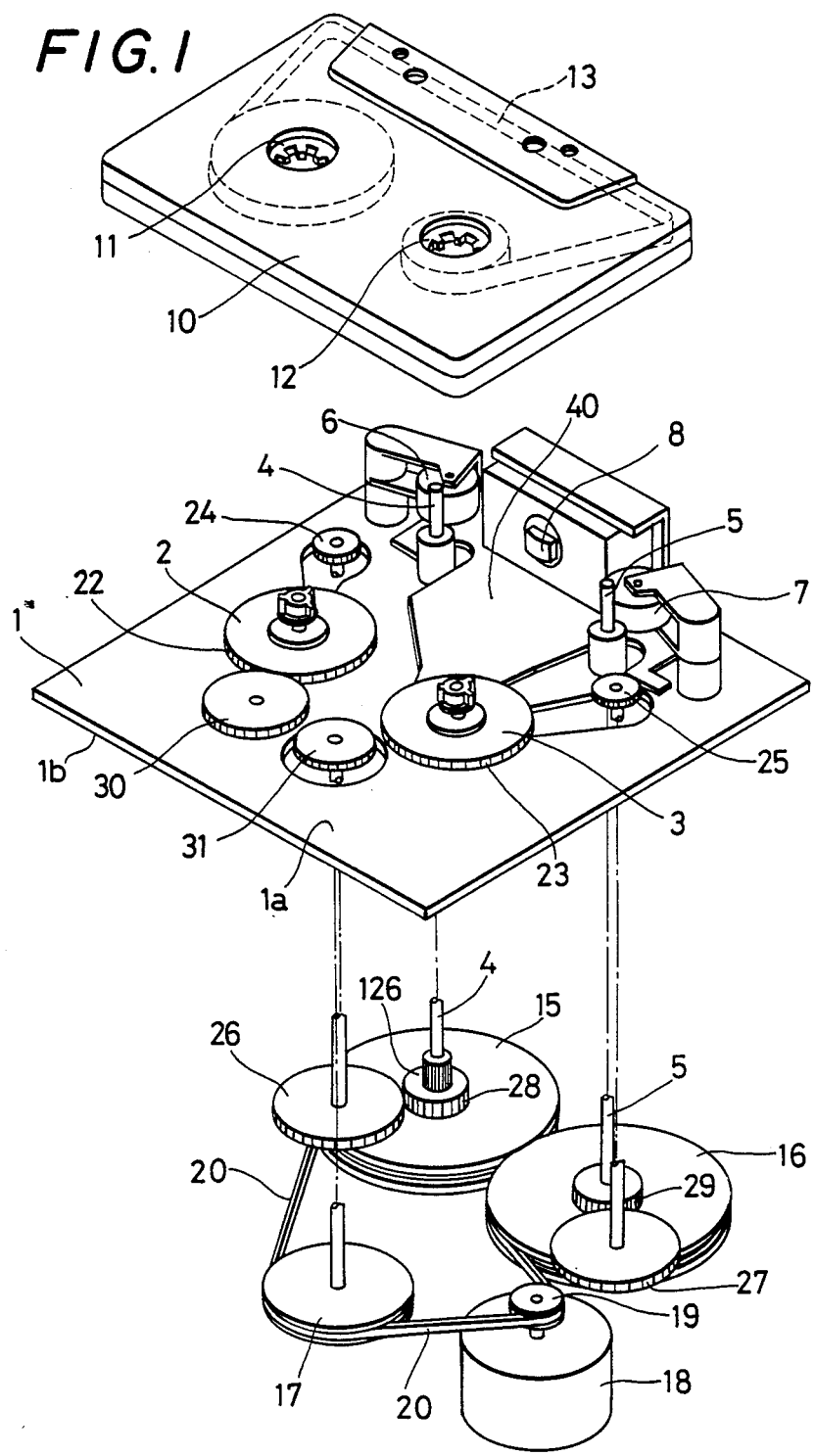
FIG. 1 is an exploded, perspective view of the tape drive system of an auto-reverse type recorder according to an embodiment of the present invention.
Figure 2:
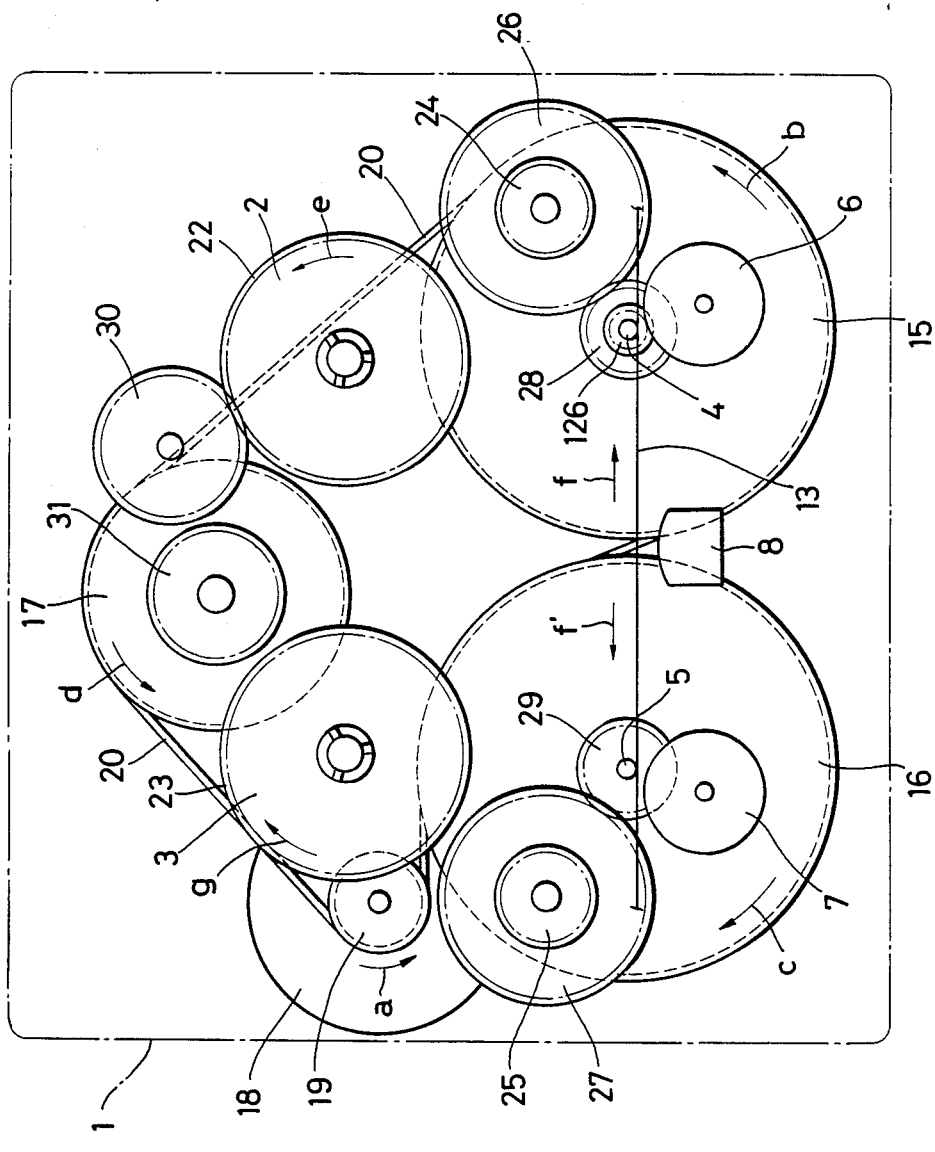
FIG. 2 is a top plan view of the tape drive system of FIG. 1.

FIGS. 1 and 2 show the tape drive system of an auto-reverse recorder that uses the well-known compact tape cartridge, in which a pair of left and right reel bases 2 and 3, capstans 4 and 5, pinch rollers 6 and 7, and a magnetic head 8 for recording and/or reproducing are provided on the upper side of a chassis 1. When a tape cartridge 10 is loaded on chassis 1, its reel hubs 11 and 12 are engaged with reel bases 2 and 3, respectively, and the magnetic tape 13 therein is looped between capstans 4 and 5 and comes in contact with magnetic head 8.

As shown in FIG. 2, capstan pulleys 15 and 16, which also serve as capstan flywheels, are fixed to the lower ends of capstans 4 and 5, respectively. A forward and reverse (FR) pulley 17 for fast-forwarding and rewinding and a motor 18, which provides the driving force for the tape recorder, are provided on a lower said 1b of chassis 1. An elastic belt 20 is looped among pulleys 15, 16, and 17 and a drive pulley 19 of motor 18. Reel base gears 22 and 23 are formed on the peripheries of the reel bases 2 and 3, respectively, and a forward (F) driver 24 for use in recording/reproducing in a forward direction and a reverse (R) driver 25 for use in recording/reproducing in a reverse direction are provided proximate the respective reel bases 2 and 3. Gears 26 and 27 are rotatable coaxially and formed integrally with F and R drivers 24 and 25, respectively, and are arranged beneath drivers 24 and 25 in the plane of FIG. 2. Gears 26 and 27 are always engaged with respective gears 28 and 29 that are coaxially attached to capstan pulleys 15 and 16, respectively.

An idler gear 30 is always engaged with reel base gear 23 of reel base 2, and a forward and reverse (FR) driver 31 for fast forwarding and rewinding is provided between idler gear 30 and reel base gear 23 of reel base 3. FR driver 31 is rotated coaxially and formed integrally with FR pulley 17 and is arranged thereunder in the plane of FIG. 2.

FIG. 2 represents a stop mode, in which if driving pulley 19 of motor 18 is rotated in a direction indicated by arrow a, capstan pulleys 15 and 16 and FR pulley 17 are driven by belt 20 in directions indicated by arrows b, c, and d, respectively. When a forward recording/reproducing mode is selected by the operation of a mode-change mechanism, which is described in detail hereinbelow, gear 26 is moved closer to the axis of rotation of reel base 2 as gear 26 becomes engaged with gear 28, and F driver 24, which is arranged on top of gear 26 in the plane of FIG. 2, is engaged with reel base gear 22 of reel base 2.

At the same time, magnetic head 8 is brought into contact with magnetic tape 13 and pinch roller 6 is pressed against capstan 4. As a result, reel base 2 is rotated in the direction indicated by arrow e, and the forward recording/reproducing mode is provided, in which magnetic tape 13 is driven in the direction indicated by arrow f, and forward recording/reproducing is performed through use of magnetic head 8.

When a reverse recording/reproducing mode is selected, gear 27 is moved closer to the axis of rotation of reel base 3 as gear 27 engages gear 29, and R driver 25, which is arranged on top of gear 27 in the plane of FIG. 2, is engaged with reel base gear 23 of reel base 3. At the same time, magnetic head 8 is brought into contact with magnetic tape 13, and pinch roller 7 is pressed against capstan 5, with the result that reel base 3 is rotated in the direction indicated by arrow g and the reverse recording/reproducing mode is provided. In such mode, magnetic tape 13 is driven in the direction indicated by arrow f' and reverse recording/reproducing is performed through use of magnetic head 8.

When a fast forward mode is selected, FR driver 31, which rotates integrally with FR pulley 17, engages idler gear 30, so that reel base 2 is rotated at high speed in the direction of arrow e. Thus, in the fast forward mode magnetic tape 13 is driven at high speed in the direction of arrow f.

When a rewind mode is selected, FR driver 31 is engaged with reel base gear 23, so that reel base 3 is rotated at high speed in the direction of arrow g. Thus, in the rewind mode magnetic tape 13 is driven at high speed in the direction of arrow f'.

In the tape recorder described above the fast forward and rewind modes may be selected from either of two different operating states. In addition, tape recorders of this kind also typically include the so-called search mode, in which fast forwarding or rewinding is performed while the magnetic head is only in light contact with the magnetic tape, in order to more quickly detect a recorded portion or a non-recorded portion between the recorded portions. Therefore, a fast-forward search mode or a rewind search mode can also be accommodated by the mode-change mechanism of the present invention.

Figure 5:
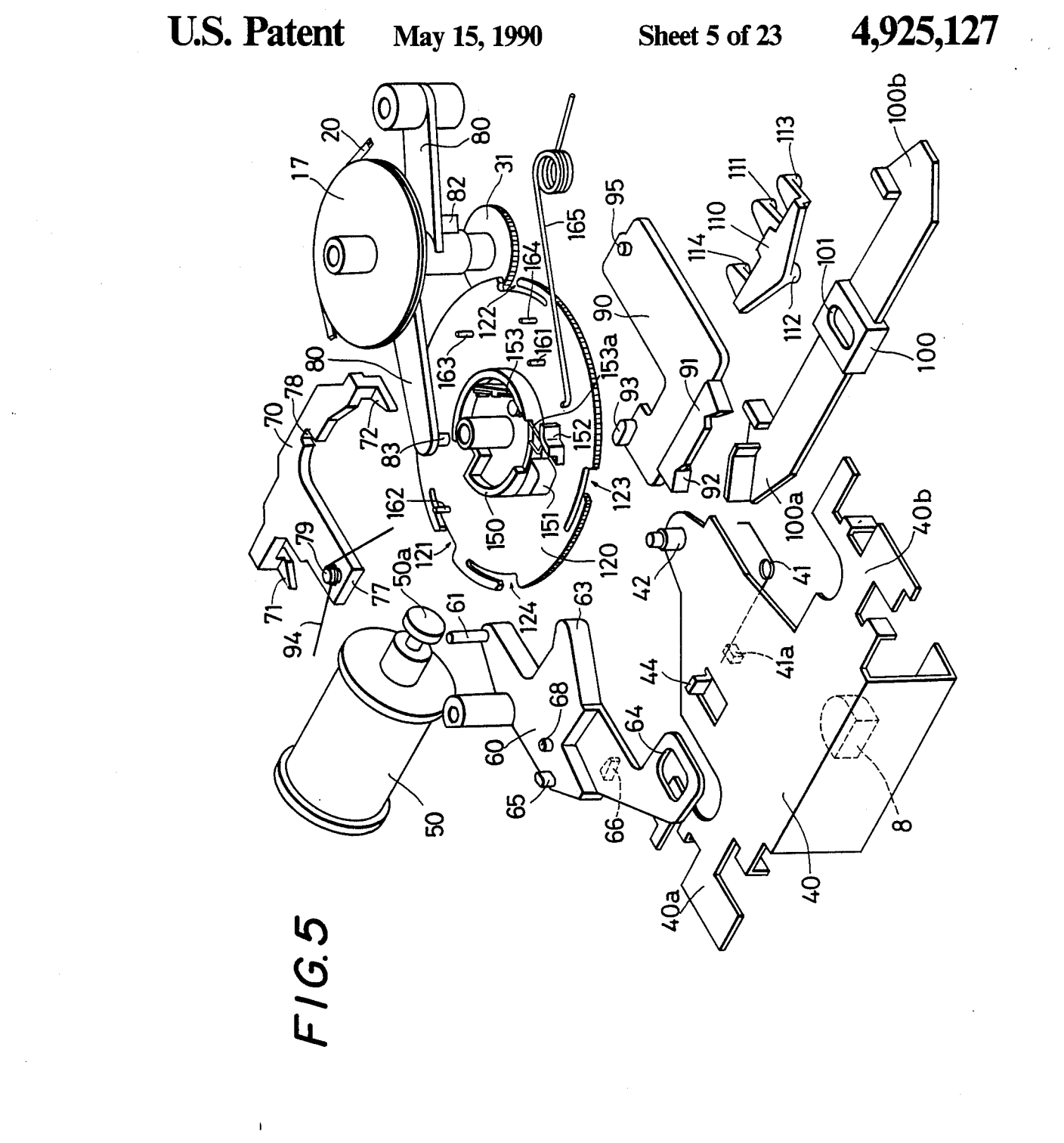
Figure 7:
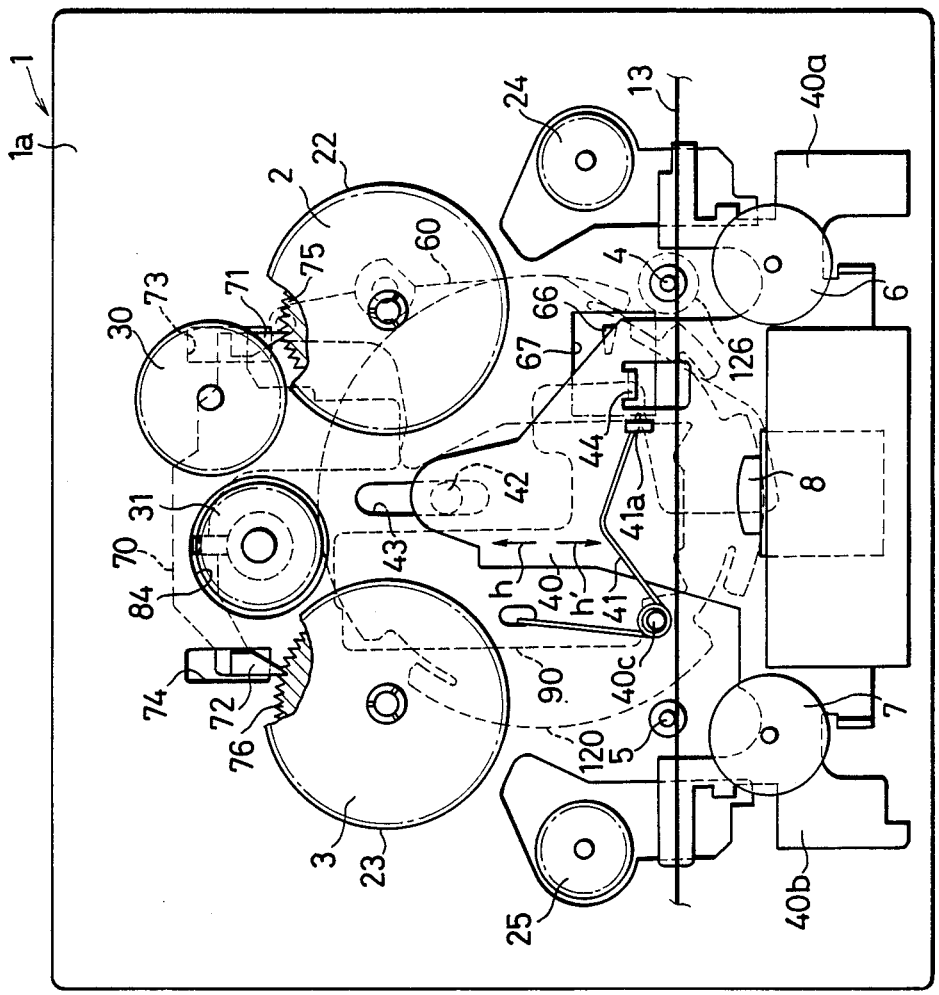
FIG. 7 is a top plan view showing the principal elements of the mode-change mechanism of FIG. 5 in the stop mode.

Referring to FIGS. 5 and 7, magnetic head 8 is turned through a predetermined angle in accordance with the driving direction of magnetic tape 13 and is mounted on a central portion of the rear end of a substantially T-shaped head baseplate 40. As shown in the top, plan view of FIG. 7, head baseplate 40 is mounted on the upper side 1a of chassis 1 for reciprocal movement in the directions indicated by arrows h and h' and is biased toward a return position, in the direction of arrow h', by a coiled torsion spring 41, one end of which is locked in a hole formed in chassis 1, the other end of which is locked by a locking piece 41a projecting from head baseplate 40, and a coiled portion of which is fitted over a pin 40c projecting from chassis 1. A pin 42 mounted on a lower surface of the front end of head baseplate 40 is inserted in a slot 43 formed in chassis 1 and projects downwardly therethrough. A downward projection 44 is formed in head baseplate 40 and is inserted in an aperture 67 formed in chassis 1.

Figure 8A:
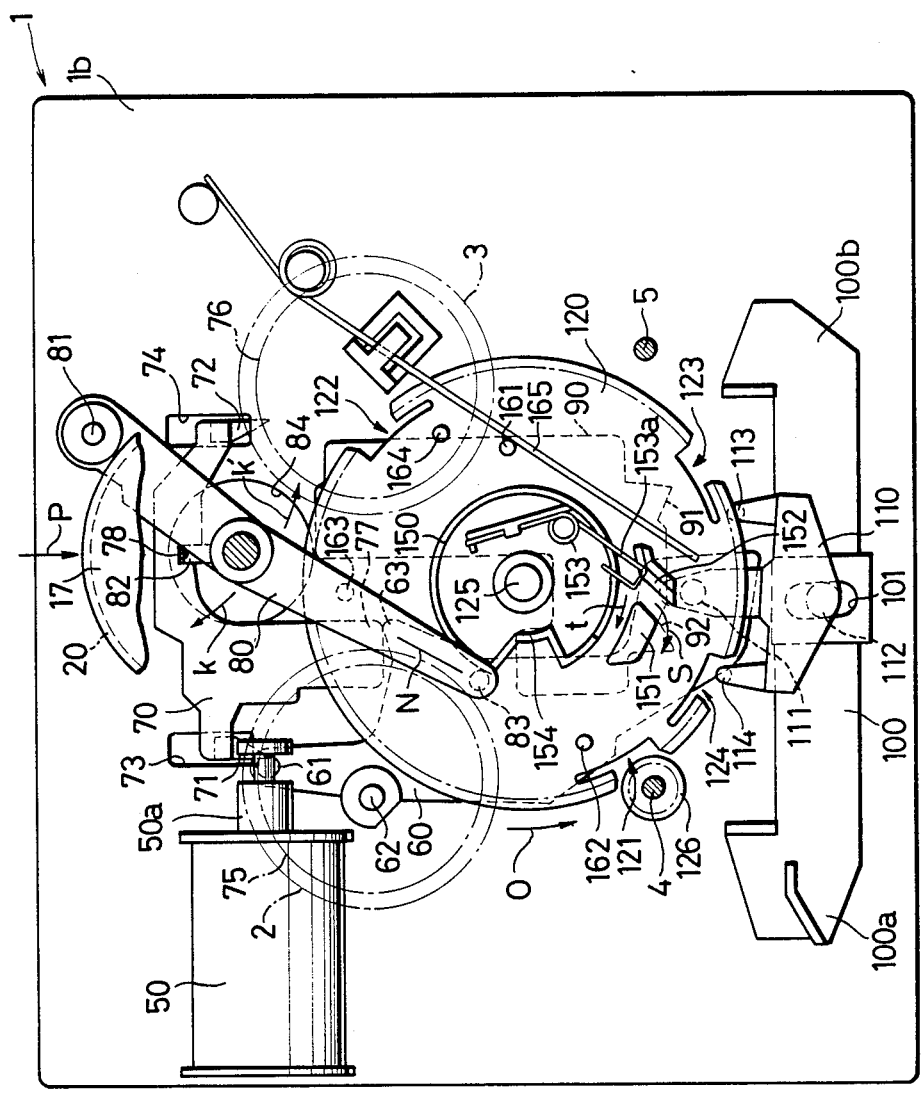
FIG. 8A is a bottom plan view showing the principal elements of the mode-change mechanism of FIG. 7.
Figure 8B:
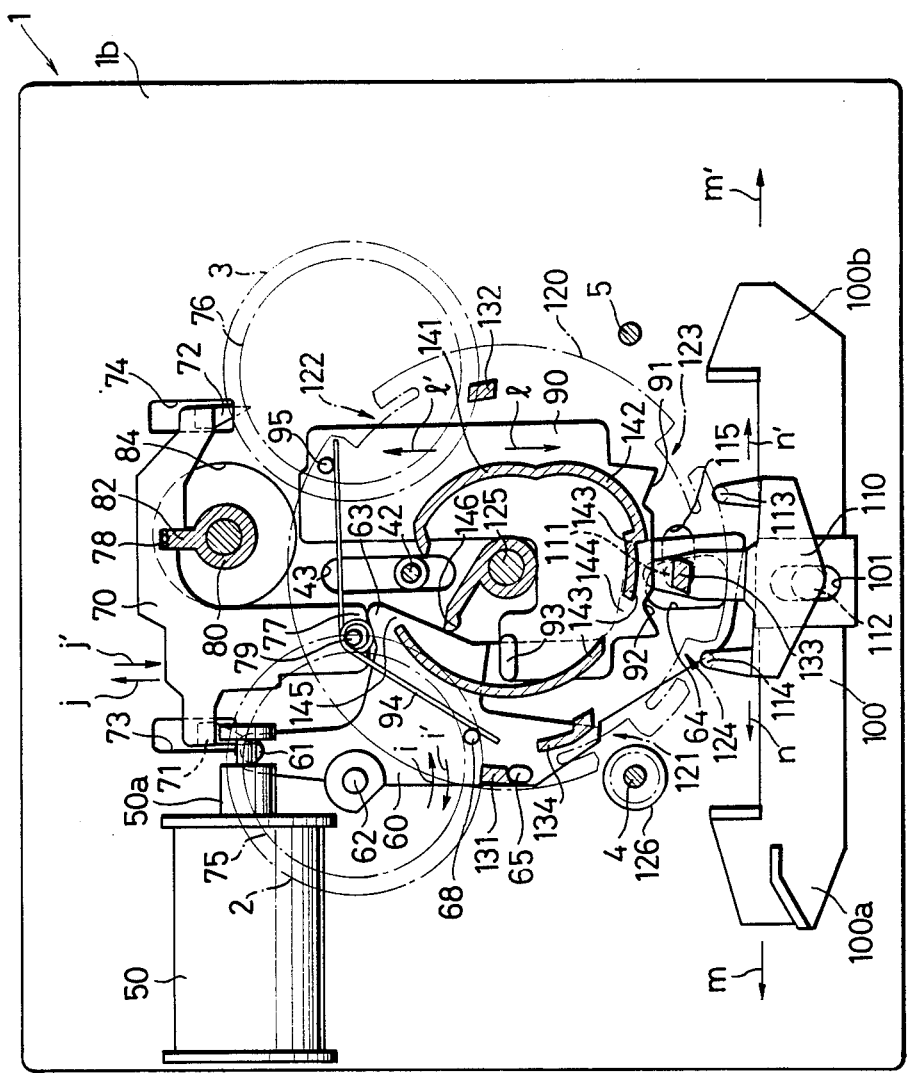
FIG. 8B is a bottom plan view in partial cross-section showing the principal elements of the mode-change mechanism of FIG. 8A.

As shown in FIGS. 5 and 8B, a solenoid 50 is mounted on lower side 1b of chassis 1, and pin 61 of a regulating lever 60 is engaged with a plunger 50a of solenoid 50. Regulating lever 60 is supported to pivot in the directions indicated by arrows i and i' by a shaft 62 protruding from chassis 1. A presser arm 63, an elongate aperture 64, and a locking projection 65, which projects downwardly, are all formed integrally with regulating lever 60. As shown in the bottom view of FIG. 5, a projection 66 projects upwardly and is formed integrally with regulating lever 60. When regulating lever 60 is moved to an advanced position in the direction of arrow i of FIG. 8B, projection 66 is located within aperture 67 (see FIG. 7) closer to a rear end of chassis 1 than projection 44 of head baseplate 40.

As shown in FIGS. 5 and 8B, a brake member 70 is mounted on lower side 1b of chassis 1 for reciprocal movement in the directions indicated by arrows j and j'. A pair of engagement portions 71 and 72 are formed integrally with left and right end portions of brake member 70, respectively. Engagement portions 71 and 72 are inserted in elongate apertures 73 and 74 formed in chassis 1, respectively, and project toward upper side 1a of chassis 1.

In FIG. 7, when brake member 70 is moved to a return position in the direction of arrow j', engagement portions 71 and 72 are engaged with teeth 75 and 76 formed on the lower flat surfaces of reel bases 2 and 3, respectively. A surface 77 of brake member 70 is pressed by presser arm 63 of regulating lever 60 and an engagement recess 78 is centrally formed on a side arm of brake member 70.

FR change lever 80 for fast forwarding and rewinding is arranged beneath brake member 70 at lower end 1b of chassis 1, as shown in FIGS. 5 and 8A. FR change lever 80 rotatably supports FR pulley 17 that has FR driver 31 coaxially mounted therewith. FR change lever 80, which is pivotally supported at one end by a shaft 81 shown in FIG. 8A, can pivot in the directions indicated by arrows k and k'. In this case, since drive belt 20 is wound around FR pulley 17 of FR change lever 80, FR change lever 80 is urged in the direction of arrow k' by a force denoted generally as P generated by the elasticity of drive belt 20.

An engagement projection 82 is formed integrally with FR change lever 80 at a central portion thereof for engagement with engagement recess 78 of brake member 70. Thus, when engagement projection 82 is disengaged from engagement recess 78, FR change lever 80 is free to rotate in the directions of arrows k and k', and when engagement projection 82 is engaged with engagement recess 78 FR change lever 80 is held in a neutral position N, where FR driver 31 is not engaged with any adjacent gear. Note that a drive pin 83 projects upwardly and is formed integrally with the distal end of FR change lever 80, and that a circular aperture 84 is formed in chassis 1 for receiving driver 31.

In FIGS. 5 and 8B, a selectively actuated slider 90 is arranged on lower side 1b of chassis 1 for reciprocal movement in the directions indicated by arrows l and l'. A pair of left and right presser surfaces 91 and 92 and a downward projection 93 are formed integrally with slider 90. Regulating lever 60, brake member 70, and slider 90 are biased to return positions in the directions of respective arrows i', j', and l', by a coiled torsion spring 94, the coiled portion of which is wound around a pin 79 formed on brake member 70. One end of spring 94 is engaged with a spring stop 68 on regulating lever 60 and the other end of spring 94 is engaged with a spring stop 95 on slider 90. A changeover slider 100 is mounted at a rear end of lower side 1b of chassis 1 for slidable movement between a forward position in a direction indicated by arrow m and a reverse position in a direction indicated by arrow m'. When changeover slider 100 is slid in one of the two directions m and m', magnetic head 8 is selectively turned by the predetermined angle, and F driver 25 and pinch roller 6, or R driver 25 and pinch roller 7, are selectively restrained by the respective end 100a or 100b of changeover slider 100.

A slot 101 is formed in a central portion of changeover slider 100, and a changeover member 110 is mounted between changeover slider 100 and regulating lever 60. A fulcrum pin 111 projecting toward upper side 1a of chassis 1, a fulcrum pin 112 projecting in the same direction as fulcrum pin 111, and a pair of left and right pressing portions 113 and 114 are formed integrally with changeover member 110. More specifically, fulcrum pin 111 is inserted in elongated hole 64 of regulating lever 60 and then inserted in an elongate aperture 115 of chassis 1, and fulcrum pin 112 is inserted in elongate hole 101 of changeover slider 100, so that changeover member 110 can pivoted about either fulcrum pin 111 or fulcrum pin 112 in directions indicated by arrows n and n', respectively. Pressing portions 113 and 114 of changeover member 110 are selectively engaged with pressers 91 and 92 of selective slider 90.

As shown in FIGS. 5 and 8A, a gear 120 that has peripheral portions that are toothless and includes cams formed thereon is rotatably supported by a shaft 125 projecting from chassis 1 at lower side 1b and substantially at the center thereof in a position lower than regulating lever 60 and selective slider 90. A first, a second, a third, and a fourth toothless peripheral portions 121, 122, 123, and 124 are formed in turn around the periphery of gear 120. Gear 120 is intermittently rotated in a direction indicated by arrow o in FIG. 8A by a driving gear 126, which is formed coaxially and integrally with capstan pulley 15, shown in FIG. 1.

Figure 6:
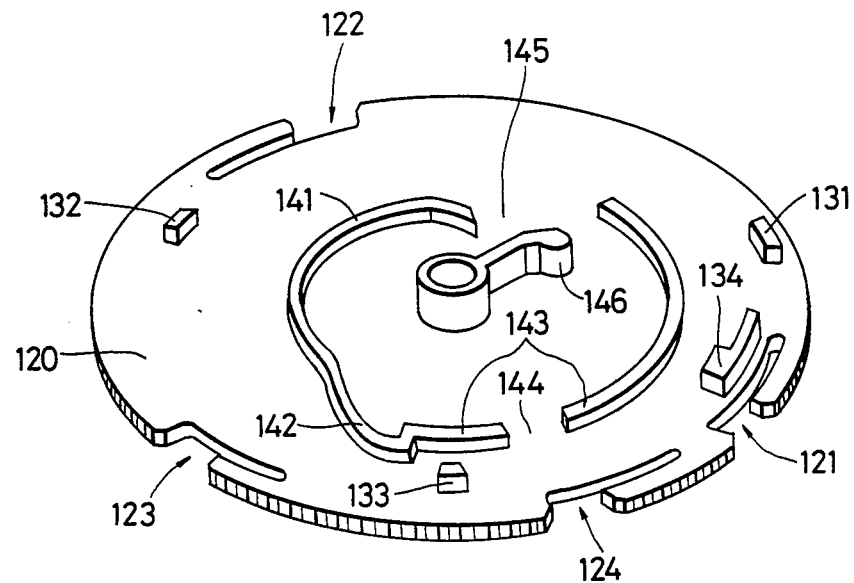
FIG. 6 is a perspective view of a gear having partially toothless peripheral portions and cams formed thereon used on the mode-change mechanism of FIG. 5.

As shown in FIGS. 6 and 8B, a first, a second, a third, and a fourth locking projections 131, 132, 133, and 134 are formed on gear 120 near the periphery thereof and on the upper, flat surface that faces the lower surface of chassis 1, and one of the locking projections selectively abuts locking projection 65 of regulating lever 60. On the upper surface of gear 120 there is a cam formed for driving drive pin 42 of head baseplate 40, which cam comprises a first cam portion 141 having a constant radius, a second cam portion 142 following first cam portion 141 and having a gradually increasing radius, and a third cam portion 143 following second cam portion 142 and having a constant radius a little smaller than that at the conclusion of second cam portion 142. A gap 144 is formed in third cam portion 143 and a gap 145 is formed between the third and first cam portions 143 and 141. Further, a projecting portion 146 for pressing projection 93 of selective slider 90 is formed integrally with the gear 120 near the center and on the upper surface thereof. Projecting portion 146 projects a little higher above the flat surface of gear 120 than cam portions 141, 142, and 143, as shown in FIG. 6.

FIGS. 5 and 8A show that a cam 150 for driving pin 83 of FR change lever 80 is also formed integrally with gear 120 on the lower surface thereof. In addition, a cam protrusion 151, which provides the fast forward mode, and a cam projection 152 adjacent cam protrusion 151 are both formed near the cam profile of cam 150 on the bottom surface of gear 120. These three cams 150, 152, 153 combine to form a first cam passageway S, formed between cam protrusion 151 and cam projection 152, and a second cam passageway t is formed between the cam protrusion 151 and cam 150.

A coiled torsion spring 153 is fixed at its one end to gear 120 at the inner side of cam 150, that is, at the side near the center of partially toothless gear 120, and the free end 153a of spring 153 protrudes over cam 150 to the location where the two passageways or grooves S and t branch. A recess 154, which is employed in the rewind mode, forms a part of the cam profile of cam 150.

A first, second, third, and fourth pin 161, 162, and 163, and 164 are formed integrally with gear 120 along with the cams on the lower surface thereof. Pins 161, 162, 163, and 164 are selectively engaged by an arm of a coiled torsion spring 165 mounted on chassis 1, so as to provide an initial torque, acting in the direction of arrow o, to gear 120.

In the stop mode, with reference to FIGS. 3, 4, and 7, to 8B, solenoid 50 is turned off and the plunger 50a is in its state of furthest extension. As shown in FIG. 8B, regulating lever 60 is moved to a return position in the direction of arrow i', and first locking projection 131 of gear 120 abuts locking projection 65 of regulating lever 60, so that gear 120 having the cams integrally formed therewith is locked in the state in which first toothless peripheral portion 121 is in opposed relation to drive gear 126. Since regulating lever 60 is moved to the return position, brake member 70 is moved to a return position in the direction of arrow j'. Therefore, as shown in FIG. 7, engagement portions 71 and 72 are engaged with teeth 75 and 76 of reel bases 2 and 3, respectively, so that rotation of reel bases 2 and 3 is restrained.

Figure 3:
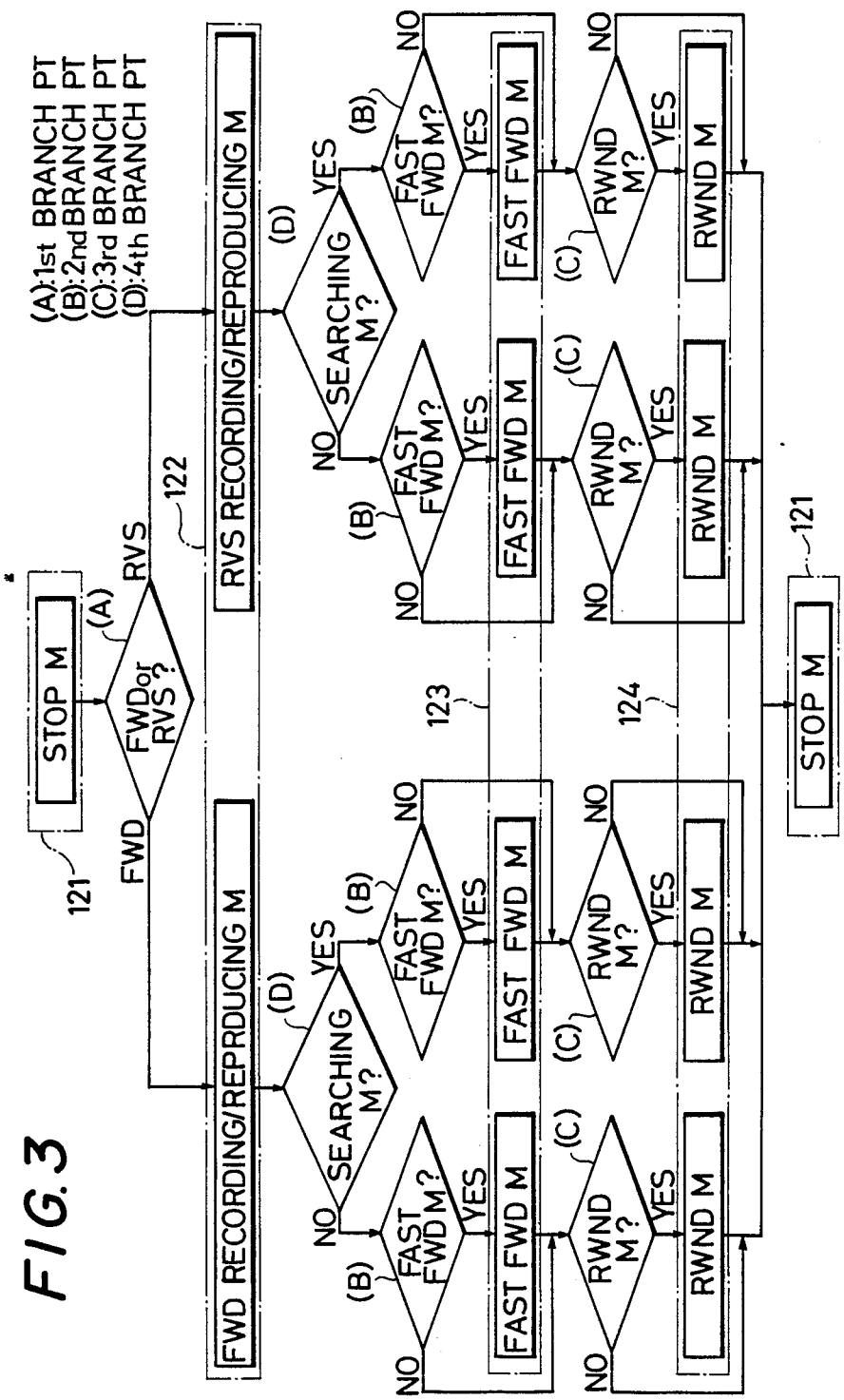
FIG. 3 is a flow chart representing the steps to be performed in a mode-changing operation.
Figure 4:
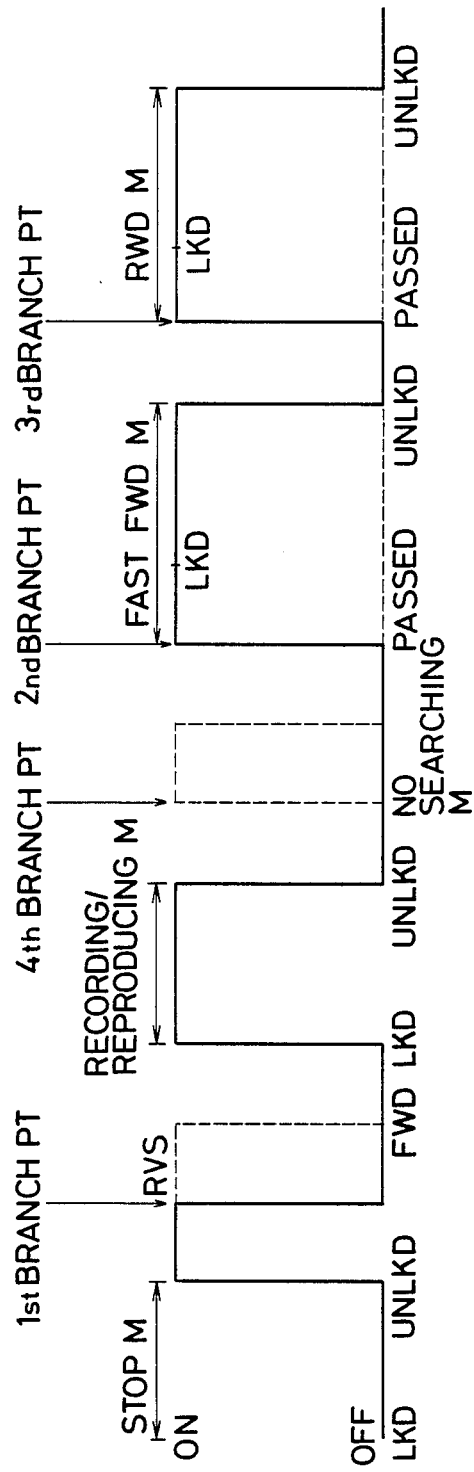
FIG. 4 is a timing chart of the steps of the mode-changing operation relative to the on-off operation of a solenoid employed in the mode changing mechanism.

As shown in FIG. 8A, because engagement recess 78 of brake member 70 is engaged with engagement projection 82 of FR change lever 80, FR change lever 80 is held in the neutral position N. Therefore, as shown in FIG. 7, FR driver 31 is spaced apart from both idler gear 30 and reel base gear 23. Head baseplate 40 is moved to a return position in the direction of arrow h' and drive pin 42 is located at gap 145 of the cam formed on gear 120, as shown FIG. 8B. As shown in FIG. 7, because head baseplate 40 is moved to the return position, magnetic head 8 is completely separated from magnetic tape 13, and F driver 24, R driver 25, and pinch rollers 6 and 7 are also moved to the return positions. In FIG. 8B, slider 90 is also moved to the return position in the direction of arrow l', in which the stop mode shown in FIGS. 3 and 4 is provided. Note that in a pause mode, the state is the same as that of the stop mode.

Referring to FIGS. 3, 4, and 8A to 10, the operation to be performed in selecting the "forward" or "reverse" modes will be described.

First, when a command to change to a recording/reproducing mode is present, solenoid 50 is energized and plunger 50a is withdrawn to its position of least extension. In FIG. 8B, regulating lever 60 is moved to the advanced position in the direction of arrow i and locking projection 65 is unlocked from first locking projection 131 of gear 120, which also includes the cams as described above.

Therefore, as shown in FIG. 8A, first spring stop 161 of gear 120 is pressed by the arm of coiled torsion spring 165, and an initial torque in the direction of arrow o is applied to gear 120. As a result, gear 120 is engaged with the driving gear 126 and rotated in the direction of arrow o.

Figure 9A:
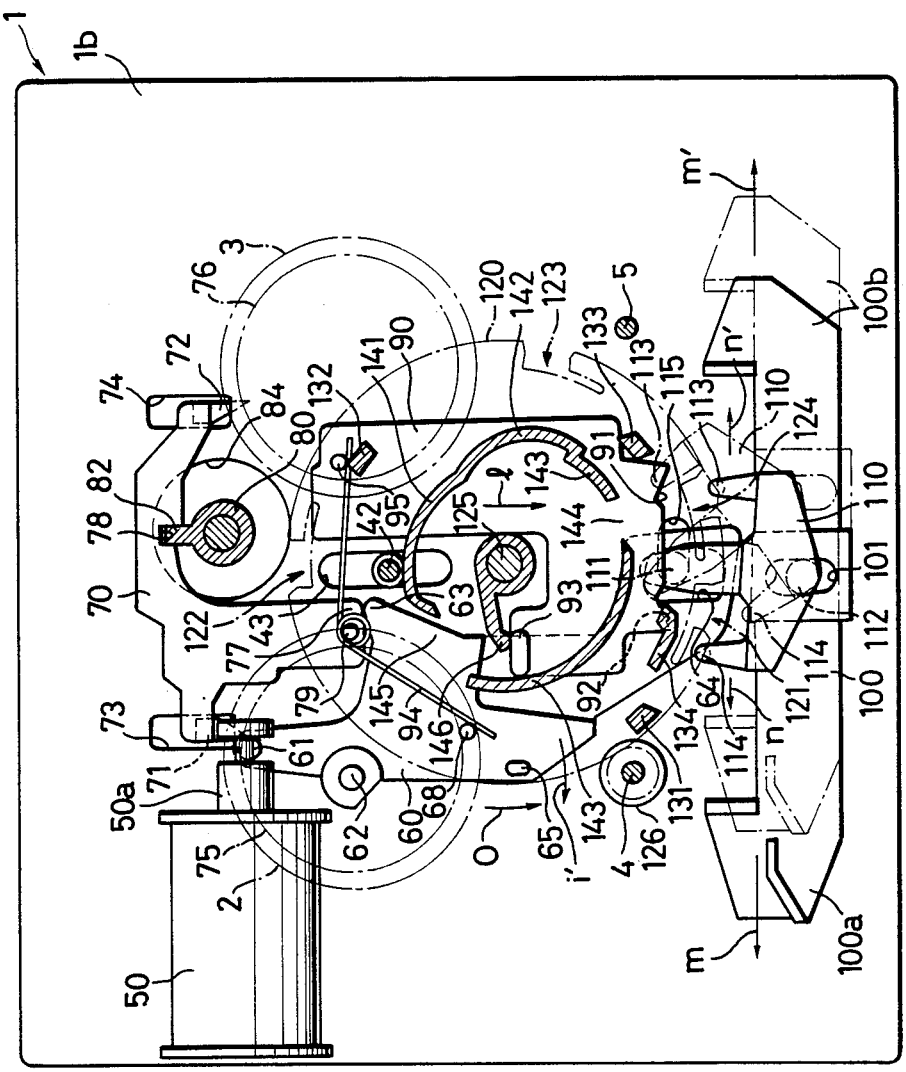
FIG. 9A is a bottom plan view in partial cross-section showing the principal elements of the mode-change mechanism of FIG. 5 at a time when a forward drive of the tape is selected.

A first branch point A where "forward" or "reverse" is selected by turning "on" or "off" solenoid 50, as shown in FIGS. 3 and 4, is provided after locking projection 65 is unlocked from first locking projection 131. Therefore, if "forward" is commanded, solenoid 50 is immediately turned "off" after unlocking, which was caused by the "on" state thereof. As a result, as shown in FIG. 9A, regulating lever 60 is moved to the return position in the direction of arrow i', so that changeover member 110 is pivoted about fulcrum pin 112 in the direction of arrow n due to the function of elongate aperture 64 of regulating lever 60.

In this case, because gear 120 has been rotated in the direction of arrow o, projected portion 146 of gear 120 presses projection 93 of slider 90, so that selective slider 90 is moved to an advanced position in the direction of arrow l. Therefore, if changeover slider 100 is located in a forward position in the direction of arrow m from the beginning, as indicated by the solid lines in FIG. 9A, changeover member 110 is not operated by slider 90, and changeover slider 100 is kept in the forward position.

On the contrary, if changeover slider 100 is located in a reverse position in the direction of arrow m', as indicated by alternate long and dashed lines, presser portion 113 of changeover member 110 is pressed by presser 91 of slider 90. Therefore, changeover member 110 is pivoted about fulcrum pin 111 in the direction of arrow n, and changeover slider 100 is moved in the direction of arrow m by fulcrum pin 112. As a result, changeover slider 100 is located at the forward position. That is, in either case, changeover slider 100 is located in the forward position.

Figure 9B:
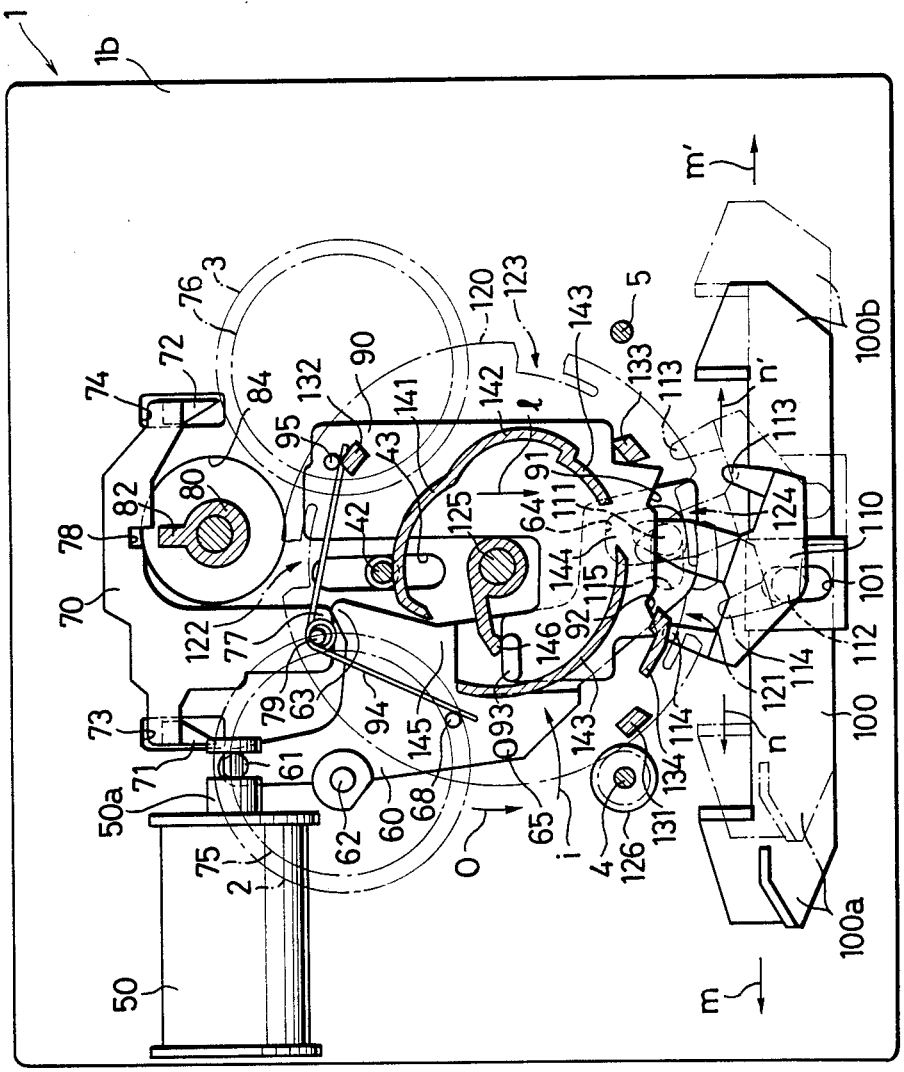
FIG. 9B is a bottom plan view in partial cross-section showing the principal elements of the mode-change mechanism of FIG. 9A at a time when a reverse drive of the tape is selected.

Next, if "reverse" is commanded at the first branch point A of the flow chart of FIG. 3, regulating lever 60 is kept in the advanced position in the direction of arrow i, as shown in FIG. 9B, because solenoid 50 has been kept "on" subsequent to being turned "on" at the time of unlocking. Therefore, as shown in FIG. 9B, changeover member 110 is kept in a state pivoted in the direction of arrow n' about fulcrum pin 112 due to the function of elongate aperture 64 of regulating lever 60. In addition, similar to the above case of "forward" being commanded, the selective slider 90 has been moved to the advanced position in the direction of arrow by the rotating partially toothless gear 120.

Therefore, if changeover slider 100 is located in the reverse position in the direction of arrow m', as indicated by alternate long and dashed lines, the changeover lever 119 is not operated, and the changeover slider 100 is kept in the reverse position.

On the contrary, when changeover slider 100 is located in the forward position in the direction of arrow m, as indicated by solid lines, presser portion 114 of changeover member 110 is pressed by presser 92 of slider 90. Therefore, changeover member 110 is pivoted about fulcrum pin 112 in the direction of arrow n', and changeover slider 100 is moved to the reverse position in the direction of arrow m' by fulcrum pin 112. Thus, in either case, changeover slider 100 is located in the reverse position.

As described above, by turning solenoid 50 "on" or "off" at the first branch point A in the flow chart of FIG. 3, upon rotation of the partially toothless gear 120 and by action of its cams, "forward" or "reverse" is provided. During this selection, driven pin 42 of the head baseplate 40 is led by first cam 141 formed on gear 120.

Figure 10:
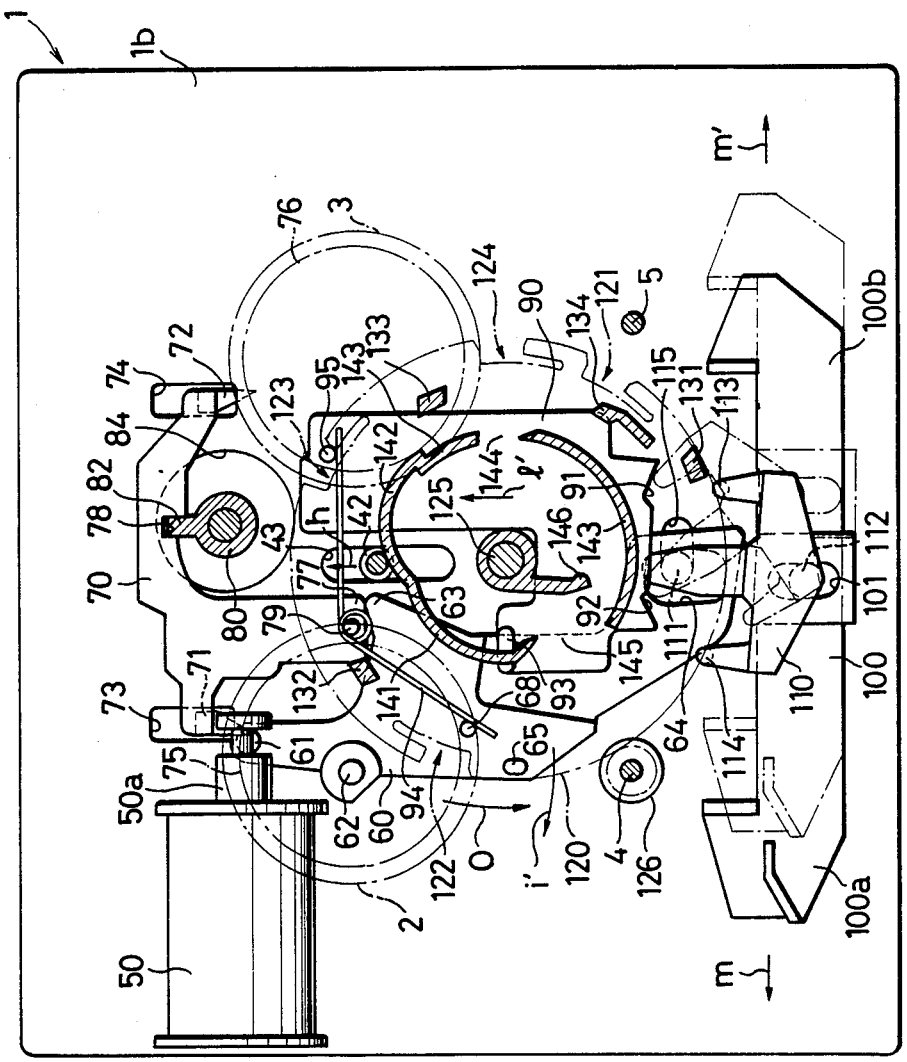
FIG. 10 is a bottom plan view in partial cross-section showing the principal elements of the mode-change mechanism of FIG. 9A in the forward or reverse drive modes.

As shown in FIG. 10, when "forward" or "reverse" is completed solenoid 50 is turned off and regulating lever 60 is moved to the return position in the direction of arrow i'. When gear 120 is further rotated projection 93 of slider 90 is disengaged from projection portion 146 of gear 120, as shown in FIG. 10. Therefore, selective slider 90 is moved to the return position in the direction of arrow l'.

Figure 11A:
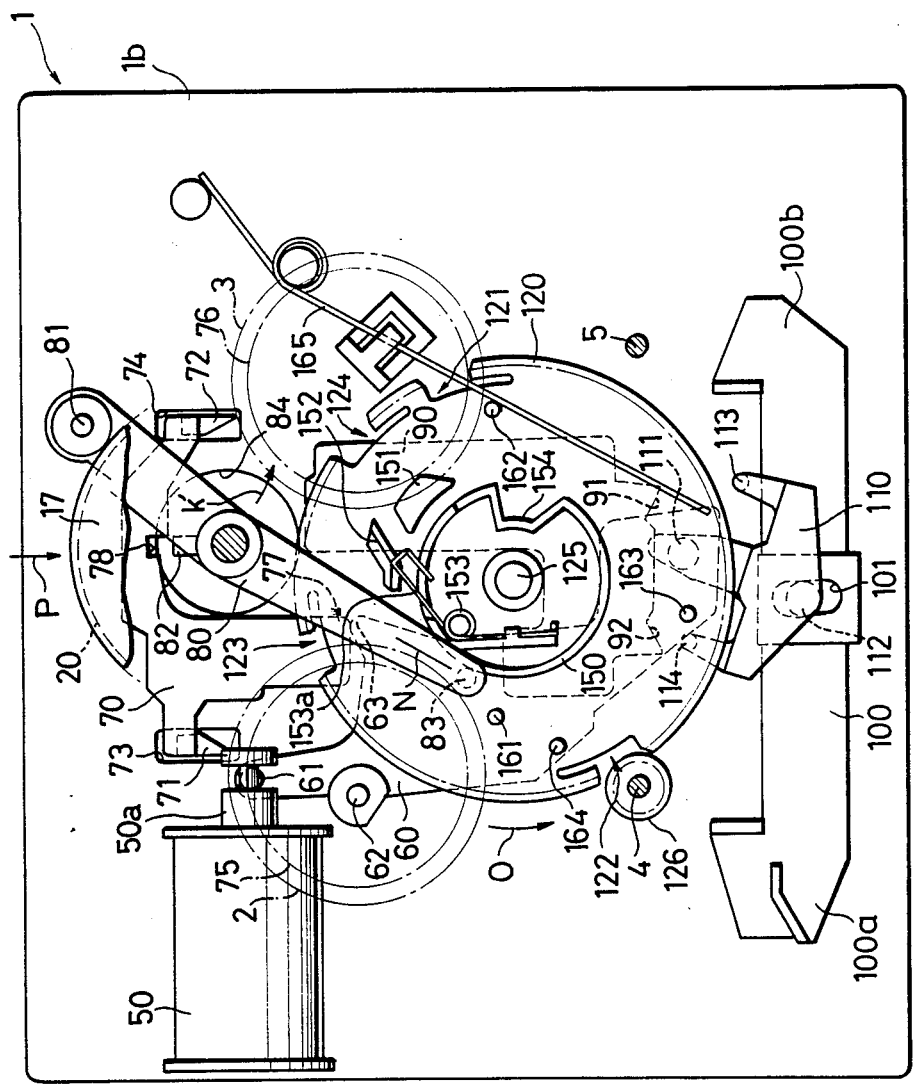
FIG. 11A is a bottom plan view showing the principal elements of the mode-change mechanism of FIG. 5 in the reproducing or recording mode.
Figure 11B:
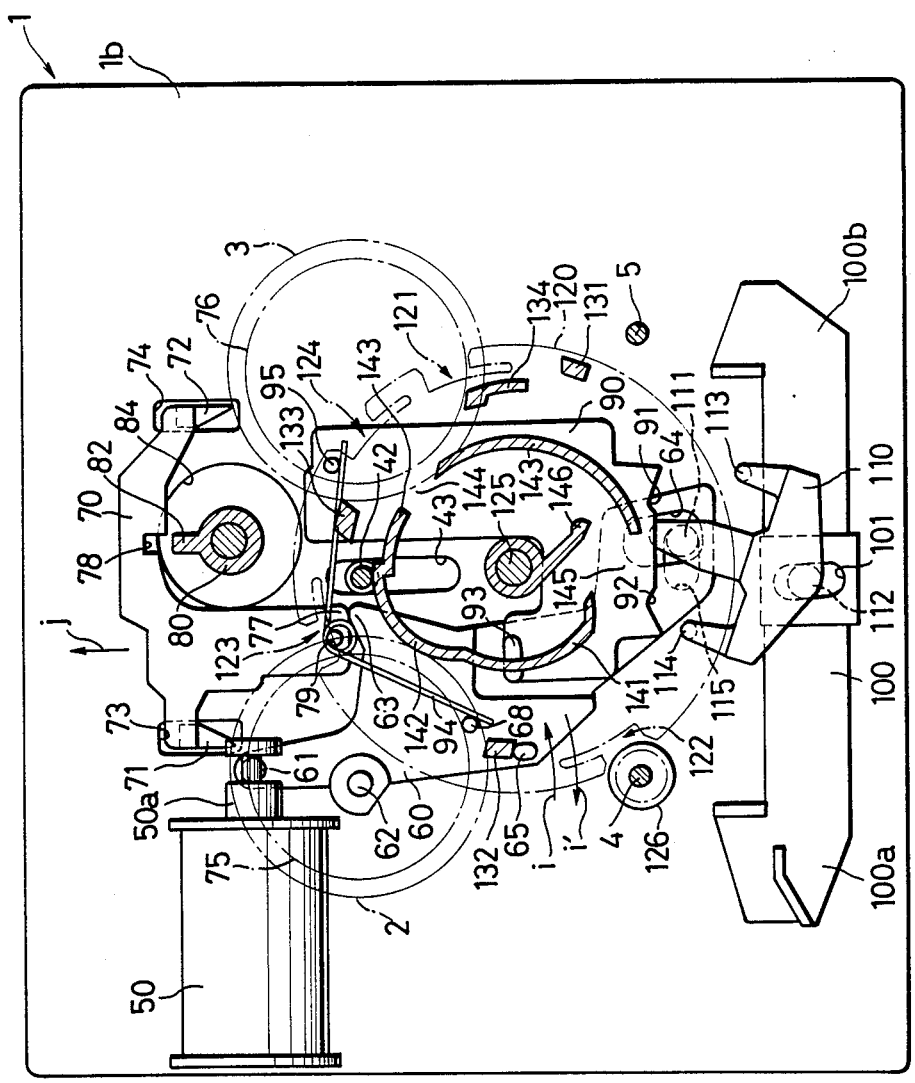
FIG. 11B is a bottom plan view in partial cross-section showing the principal elements of the mode-change mechanism of FIG. 11A.

Referring to FIGS. 3, 4, and 10 to 11B, a mode change operation to the recording/reproducing mode will be described. First because gear 120 has been subsequently rotated in the direction of arrow o after selection of "forward" or "reverse" is completed, as described above, drive pin 42 of head base plate 40 is led by second cam 142 and head baseplate 40 is moved to the advanced position in the direction of arrow h, as shown in FIG. 10. If solenoid 50 is turned "on", as shown in FIG. 11B, regulating lever 60 is moved to the advanced position in the direction of arrow i and, as a result, second locking projection 132 of gear 120 abuts locking projection 65, so that gear 120 is locked in a position where the second toothless peripheral portion 122 thereof is in opposed relation to driving gear 126. At the same time, because pressed portion 77 of brake member 70 is pressed by presser arm 63 of regulating lever 60, brake member 70 is moved to the advanced position in the direction of arrow j by regulating lever 60. Therefore, engagement portions 71 and 72 are disengaged from teeth 75 and 76 of reel bases 2 and 3, respectively, and reel bases 2 and 3 are released.

In this case, as shown in FIG. 11A, though engagement recess 78 of brake member 70 is disengaged from engagement projection 82 of FR change lever 80, and FR change lever 80 becomes free to pivot, FR change lever 80 is biased in the direction of arrow K' by force P generated by the elasticity of drive belt 20 that is wound around FR pulley 17. Therefore, pin 83 of FR change lever 80 is pressed against the cam profile of cam 150 of gear 120 and FR change lever 80 is held in the neutral position N as before.

As shown in FIG. 11B, drive pin 42 of head baseplate 40 is led by second cam 142 of gear 120 and head baseplate 40 is moved completely to the advanced position in the direction of arrow h, so that magnetic head 8 is brought into complete contact with magnetic tape 13.

Although not shown in the drawings, as R driver 25 and pinch roller 7 are restrained by other end 100b of changeover slider 100 positioned in the forward position, only F driver 24 and pinch roller 6 are moved to advanced positions by the function of the one end 40a of the head baseplate 40. As a result, the forward direction recording/reproducing mode is obtained, as described hereinabove.

Similarly, although not shown in the drawings when changeover slider 100 is located in the reverse position, F driver 24 and pinch roller 6 are restrained by one end 100a of changeover slider 100, so that only R driver 25 and pinch roller 7 are moved to the advanced positions by the other end 40b of head baseplate 40. Thus, the reverse direction recording/reproducing mode is obtained.

As described above and as shown in FIGS. 3 and 4, the recording/reproducing mode is set after "forward" or "reverse" is selected at the first branch point A.

Referring to FIGS. 3, 4, and 11A to 12B, the operation for providing a search mode will be described. First, if solenoid 50 is turned "off" during the state of the forward or reverse recording/reproducing mode, plunger 50a extends outwardly so that regulating lever 60 is moved to the return position in the direction of arrow i' in FIG. 11B, and locking projection 65 of regulating lever 60 is unlocked from second locking projection 132 of gear 120. Then, in FIG. 11A, second spring stop 162 of gear 120 is pressed by the arm of coiled torsion spring 165 and gear 120, which is urged due to an initial torque given by the spring 165, is meshed with driving gear 126. Thus, partially toothless peripheral gear 120, which includes the cams on both flat surfaces, is rotated in the direction of arrow o. After unlocking by turning "off" solenoid 50, a fourth branch point D is reached. In the fourth branch point D, either a non-search mode or a search mode can be selected by turning "on" or "off" the solenoid 50, as shown in FIGS. 3 and 4.

Figure 12A:
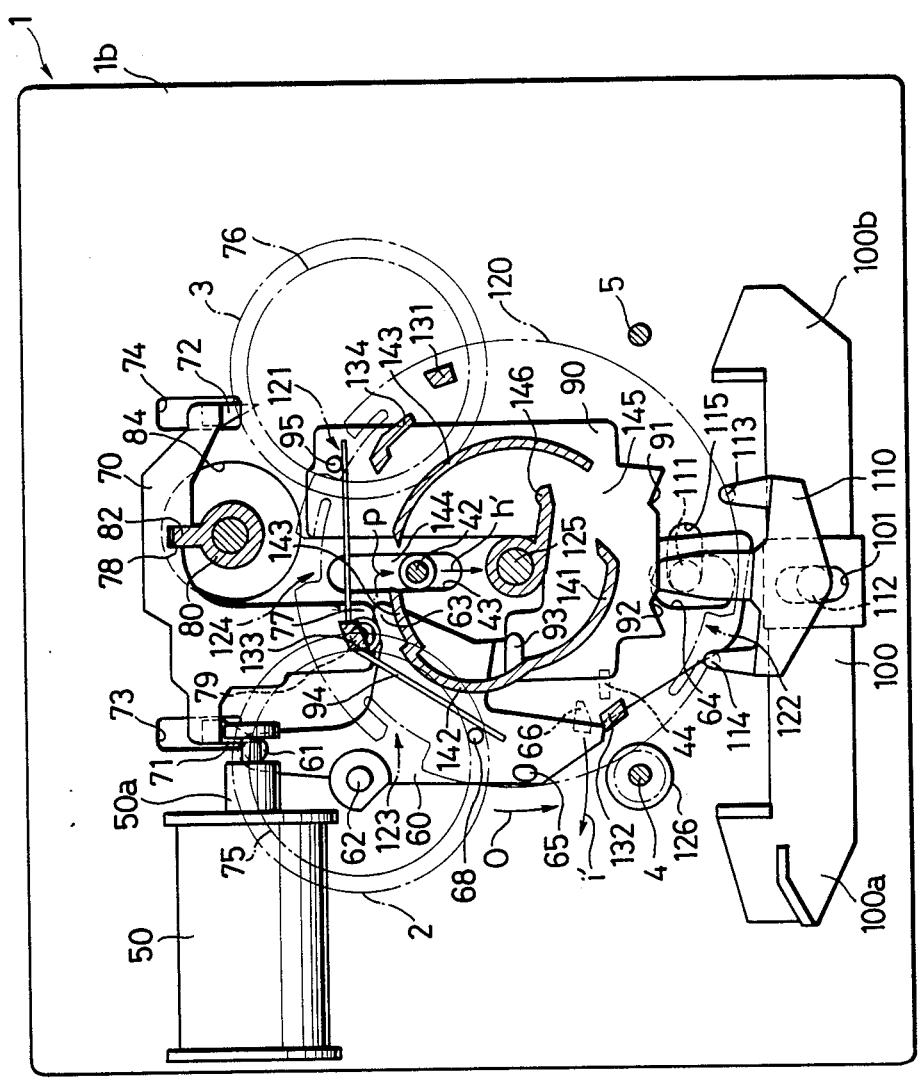
FIG. 12A is a bottom plan view in partial cross-section showing the principal elements of the mode-change mechanism of FIG. 5 when a search mode has not been selected.
Figure 12B:
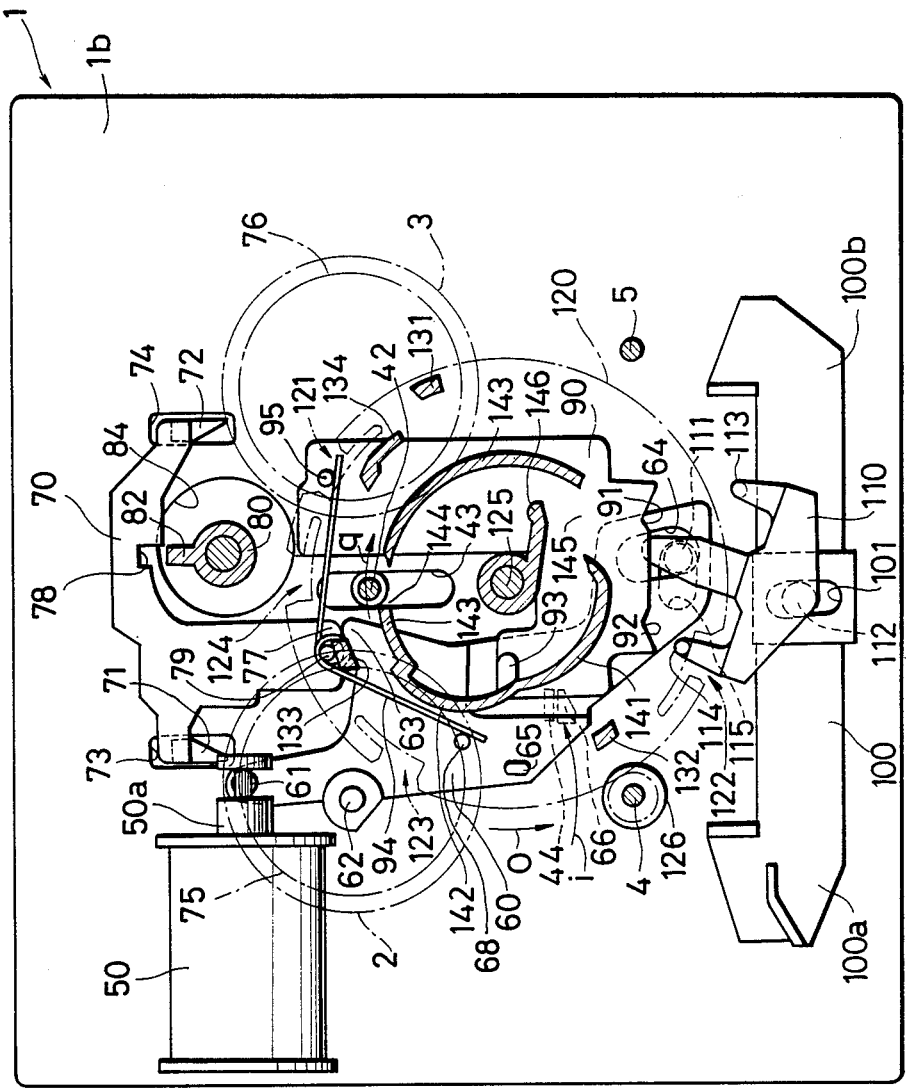
FIG. 12B is a bottom plan view in partial cross-section showing the principal elements of the mode-change mechanism of FIG. 12A at a time when the search mode is selected.
Figure 13:
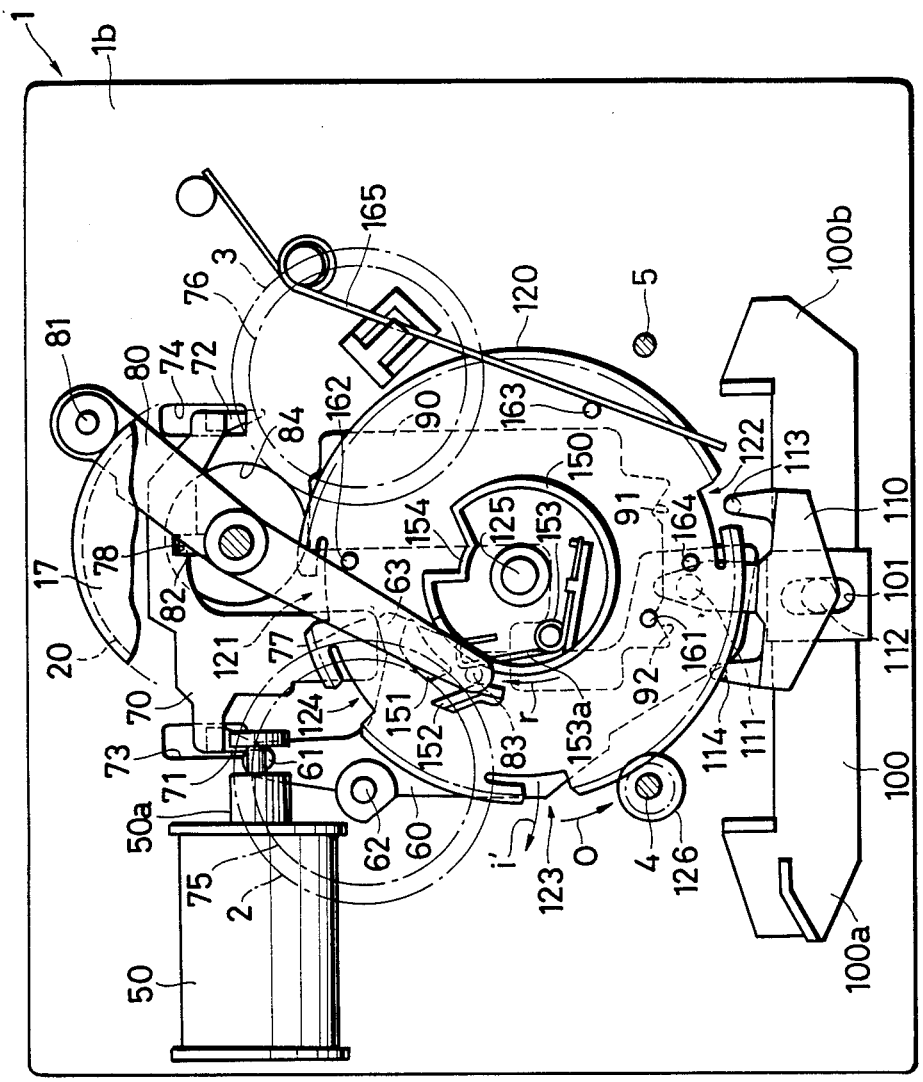
FIG. 13 is a bottom plan view showing the principal elements of the mode-change mechanism of FIG. 5 when a fast forward mode is selected.

That is, if the non-search mode is commanded at the fourth branch point D, solenoid 50 is kept "off" after unlocking, and regulating lever 60 is moved to the return position in the direction of arrow i', as shown in FIG. 12A. As a result, as shown in FIG. 12B, projection 66 of regulating lever 60 is disengaged from projection 44 of head baseplate 40.

Thus, gear 120 is rotated in the direction of arrow o and drive pin 42 of head baseplate 40 is moved along the cam profile of third cam 143. Then, drive pin 42 of head baseplate 40 reaches gap 144 disposed in the third cam 143 and it drops through gap 144, as indicated by arrow p, and head baseplate 40 is moved to the return position in the direction of arrow h'.

Thereby, magnetic head 8 is completely separated from magnetic tape 13 and F driver 24 and pinch roller 6, or R driver 25 and pinch roller 7, in the advanced position are also moved to the return position, as head baseplate 40 is moved to the return position.

Next, if the search mode is commanded at the fourth branch point D, solenoid 50 is turned "on" after unlocking has been performed by turning it "off". As a result, as shown in FIG. 12B, regulating lever 60 is moved to the advanced position in the direction of arrow i, and projection 66 of the regulating lever 60 is engaged with projection 44 of head baseplate 40.

Therefore, even if drive pin 42 of head baseplate 40 reaches gap 144 in third cam 143, it does not drop therethrough and it subsequently moves along third cam 143 in the direction of arrow q, because projection 44 of head baseplate 40 is restained by the projection 66 of regulating lever 60. Thereby, head baseplate 40 is slightly moved to the return-position in the direction of arrow h' and held, so that magnetic head 8 is brought into light contact with magnetic tape 13 to perform the search mode.

As described above, as gear 120 is rotated magnetic head 8 is selectively brought into contact with or separated from magnetic tape 13 by the turning "on" or "off" of solenoid 50 at the fourth branch point D and, thereafter, solenoid 50 is turned "off."

Referring to FIGS. 3, 4, and 13 to 14C, the operation of changing to a fast forward mode will be described. First, after the non-search or search mode is selected as described above, gear 120 has been subsequently rotated in the direction of arrow o so that pin 83 of FR change lever 80 enters between cam 150 and cam 152, as indicated by arrow r in FIG. 132, and there is provided a second branch point B. In the second branch point B, one of two states, either changed or not changed to the fast forward mode, is selected by turning "on" or "off" solenoid 50, as shown in FIGS. 3 and 4. When the fast forward mode is commanded, solenoid 50 is turned "on" and regulating lever 60 is moved to the advanced position in the direction of arrow i in FIG. 14A, so that pressed surface 77 of brake member 70 is pressed to the advanced position in the direction of arrow j by presser arm 63 of regulating lever 60. As a result, because engagement recess 78 of brake member 70 is disengaged from engagement projection 82 of FR change lever 80, FR changer lever 80 becomes free to pivot. When pin 83 of FR change lever 80 enters between cam projections 152 and 150, pin 83 is selectively led to first cam passageway, shown at arrow s, by the force of spring 153 and then reaches the outside of cam 151. Therefore, FR change lever 80 is pivoted in the direction of arrow k and, hence, FR driver 31 that is supported by FR change lever 80 is engaged with idler gear 30.

Figure 14A:
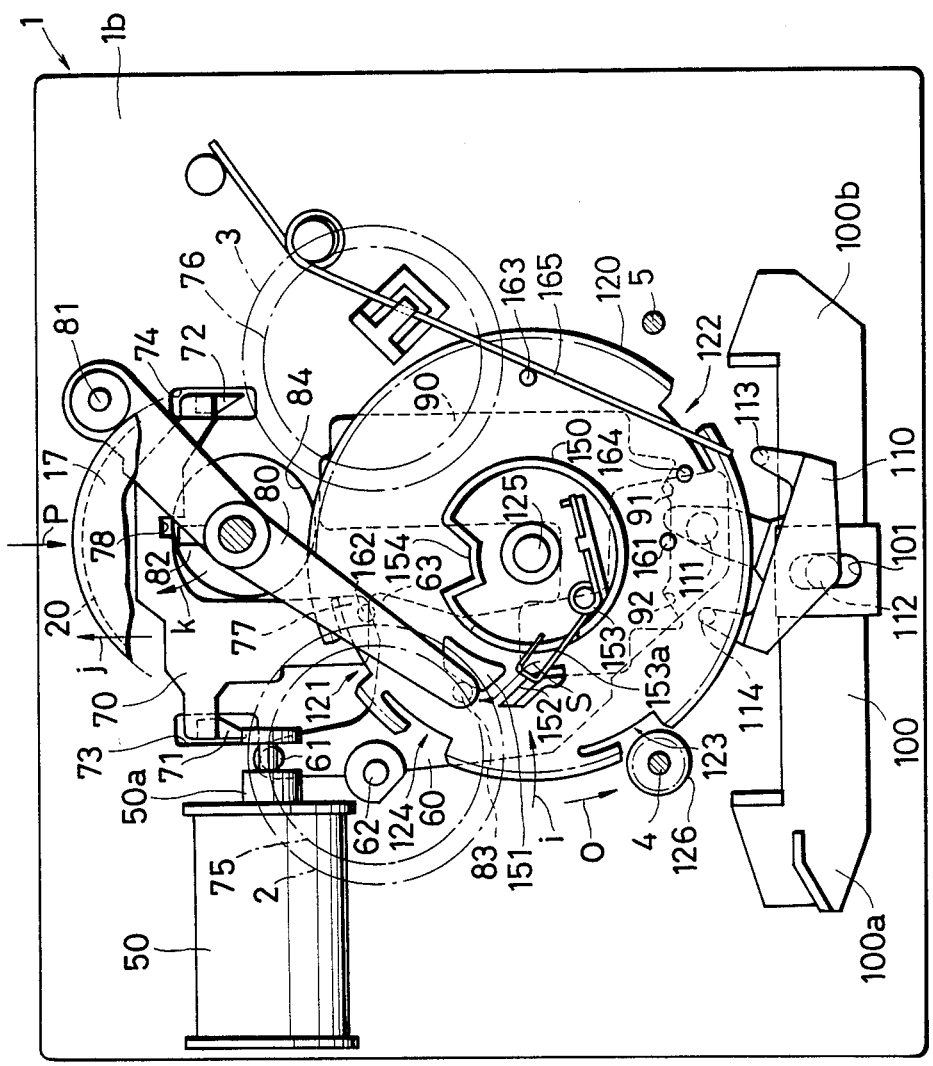
FIG. 14A is a bottom plan view showing the principal elements of the mode-change mechanism of FIG. 13 in the fast forward mode.
Figure 14B:
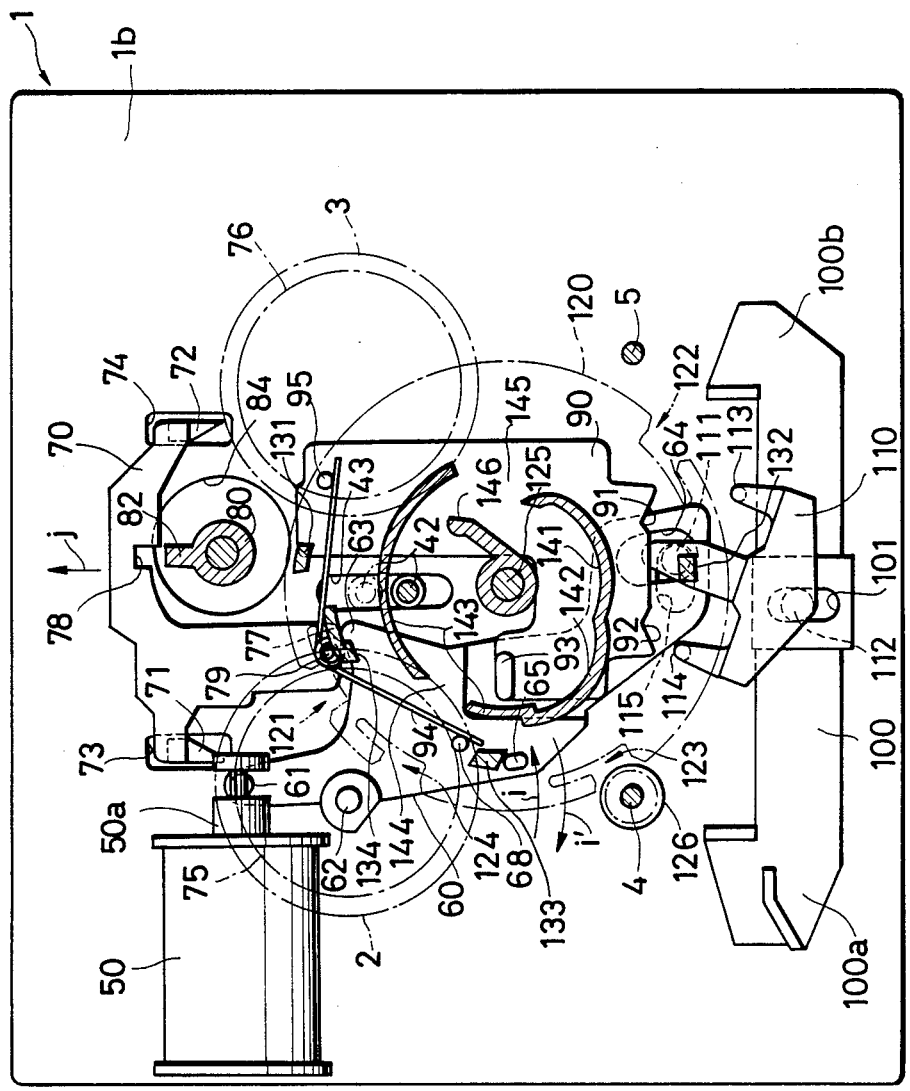
FIG. 14B is a bottom plan view in partial cross-section showing the principal elements of the mode-change mechanism of FIG. 14A.

As regulating lever 60 has been moved to the advanced position in the direction of arrow i shown in FIG. 14B by turning "on" solenoid 50, third locking projection 133 of gear 120 abuts locking projection 65, and gear 120 is locked in the position where third toothless peripheral portion 123 is in opposed relation to driving gear 126. Thus, the fast forward mode is obtained as described hereinabove.

Figure 14C:
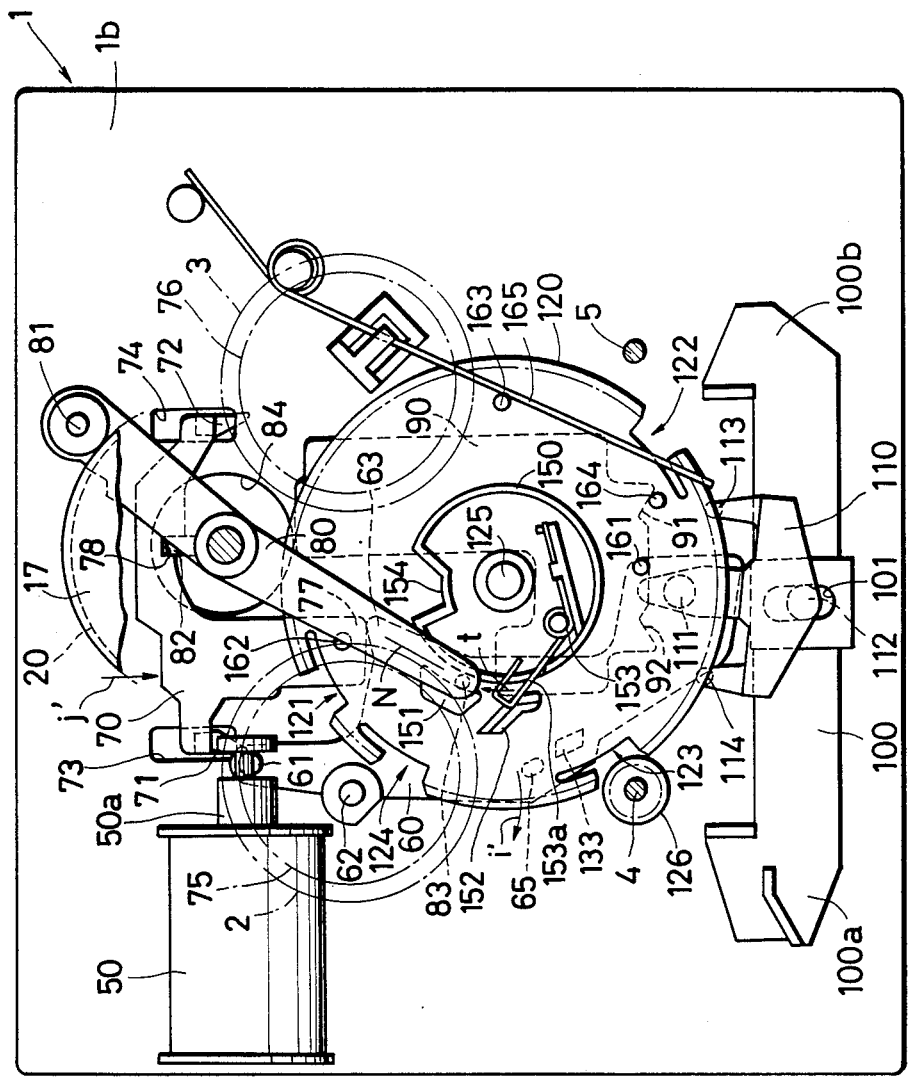
FIG. 14C is a bottom plan view showing the principal elements of the mode-change mechanism of FIG. 13 when the fast forward mode has not been selected.

When the fast forward mode is not commanded, solenoid 50 is turned "off." In FIG. 14C, as the brake member 70 has also been moved to the return position in the direction of arrow j' by the return of regulating lever 60 in the direction of arrow i', engagement recess 78 is engaged with engagement projection 82 of FR change lever 80 and FR change lever 80 is kept in the neutral position N. Therefore, pin 83 of FR change lever 80 is selectively led to second cam passageway, as shown at arrow t, between cams 150 and 151 against the force of spring 153, so that FR driver 31 is engaged with neither idler gear 30 nor reel base gear 23.

Furthermore, as solenoid 50 is turned "off" locking projection 65 of regulating lever 60 does not abut third locking projection 133, so that gear 120 is not locked, and the fast forward mode is not provided but is passed over.

Thus, as represented in FIGS. 3 and 4, one of the two states, changed or not changed to the fast forward mode, is selected at the second branch point B, so that the fast forward mode is either selected or not. If the fast forward mode is provided, as represented in FIG. 3, a forward fast forward mode, a forward fast-forward search mode, a reverse fast forward mode, or a reverse fast-forward search mode will be set by the selection of "forward" or "reverse" at the first branch point A, and the selection of the non-search mode or search mode at the fourth branch point D.

Referring to FIGS. 3, 4, and 14A to 15C, the operation for changing to a rewind mode is described, in which first solenoid 50 is turned "off" in the fast forward mode, and when the fast forward mode is passed, solenoid 50 remains "off". In FIG. 14B, regulating lever 60 is moved to the return position in the direction of arrow i', and locking portion 65 is unlocked from third locking projection 133. Therefore, in FIG. 14A, third spring stop 163 is pressed by the coiled torsion spring 165 and gear 120 is rotated due to an initial torque caused by spring 165 and is engaged with driving gear 126, so that gear 120, which includes the cams on both sides, is rotated in the direction of arrow o.

Figure 15A:
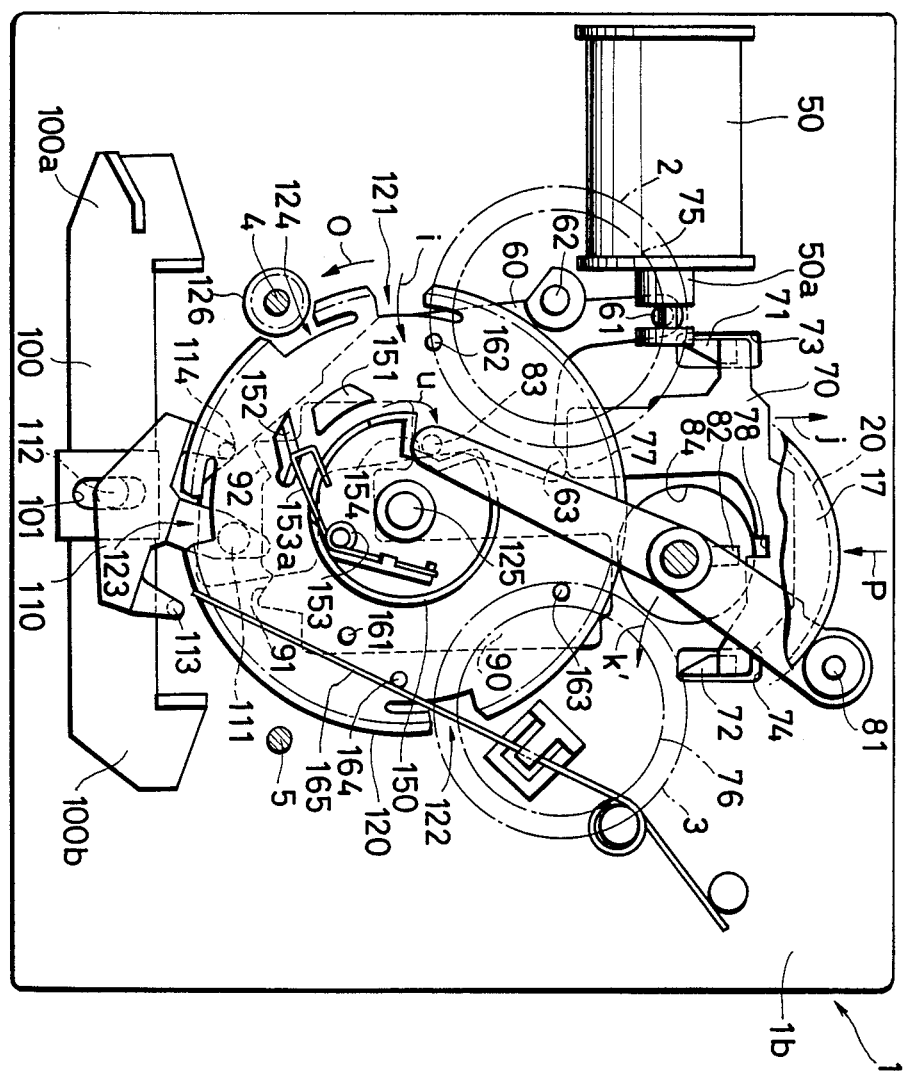
FIG. 15A is a bottom plan view showing the principal elements of the mode-change mechanism of FIG. 5 in the rewind mode.

After gear 120 is unlocked, a third branch point C is provided, as represented in FIGS. 3 and 4, in which a selection of one of two states, changed or not changed to the rewind mode, is performed by turning "on" or "off" solenoid 50. If the rewind mode is commanded, solenoid 50 is turned "on" and brake member 70 is moved to the advanced position in the direction of arrow j by regulating lever 60, as shown in FIG. 15A. Therefore, similar to the case described above, FR change lever 80 becomes free to pivot but it is pressed in the direction of arrow k' by the force P caused by the elasticity of drive belt 20 would around FR pulley 17. Pin 83 of FR change lever 80 is inserted into recess 154 of the cam profile of cam 150 upon rotation of gear 120, as indicated by arrow u, so that FR change lever 80 is pivoted in the direction of arrow k' and FR driver 31 is engaged with reel base gear 23.

Figure 15B:
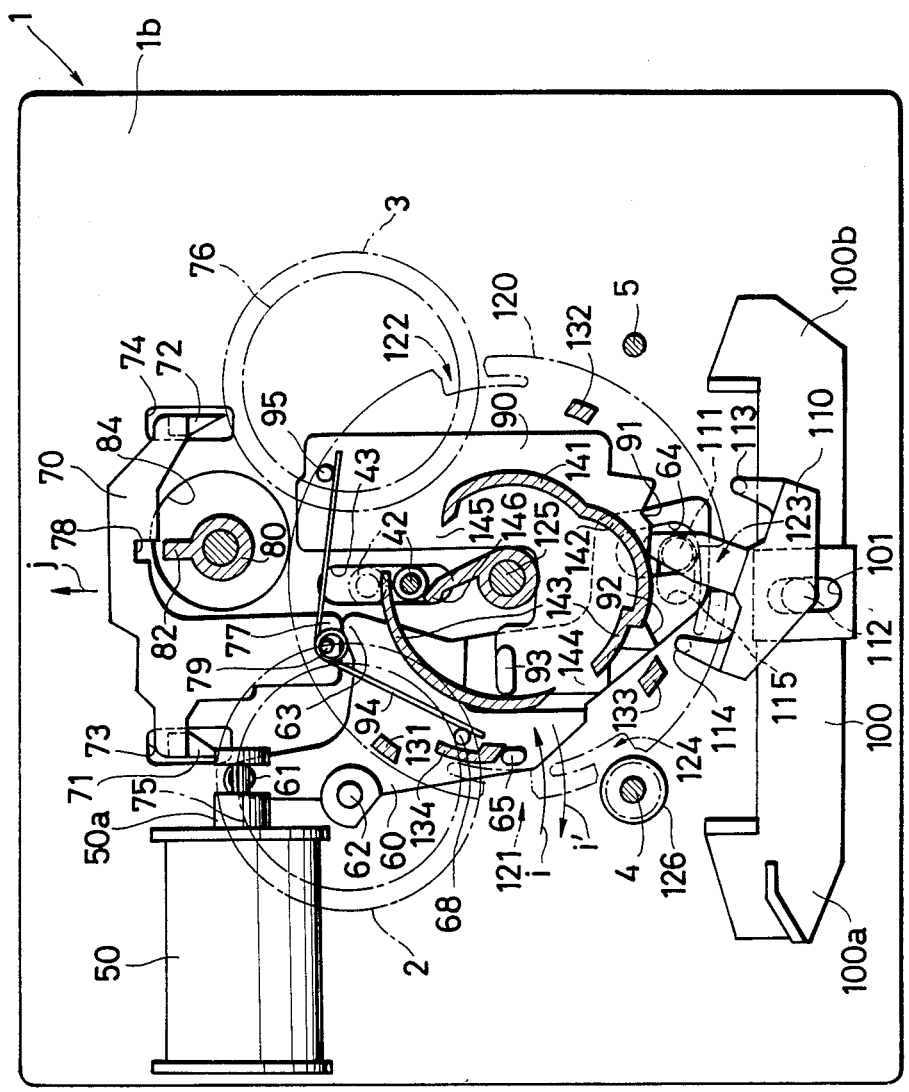
FIG. 15B is a bottom plan view in partial cross-section showing the principal elements of the mode-change mechanism of FIG. 15A.

As regulating lever 60 is moved to the advanced position in th direction of arrow i by turning "on" of solenoid operated means 50, as shown in FIG. 15B, fourth locking projection 134 abuts against locking projection 65. Therefore, gear 120 is locked in the state that fourth toothless peripheral portion 124 is in opposed relation to driving gear 126. Thus, the rewind mode is set as described above.

Figure 15C:
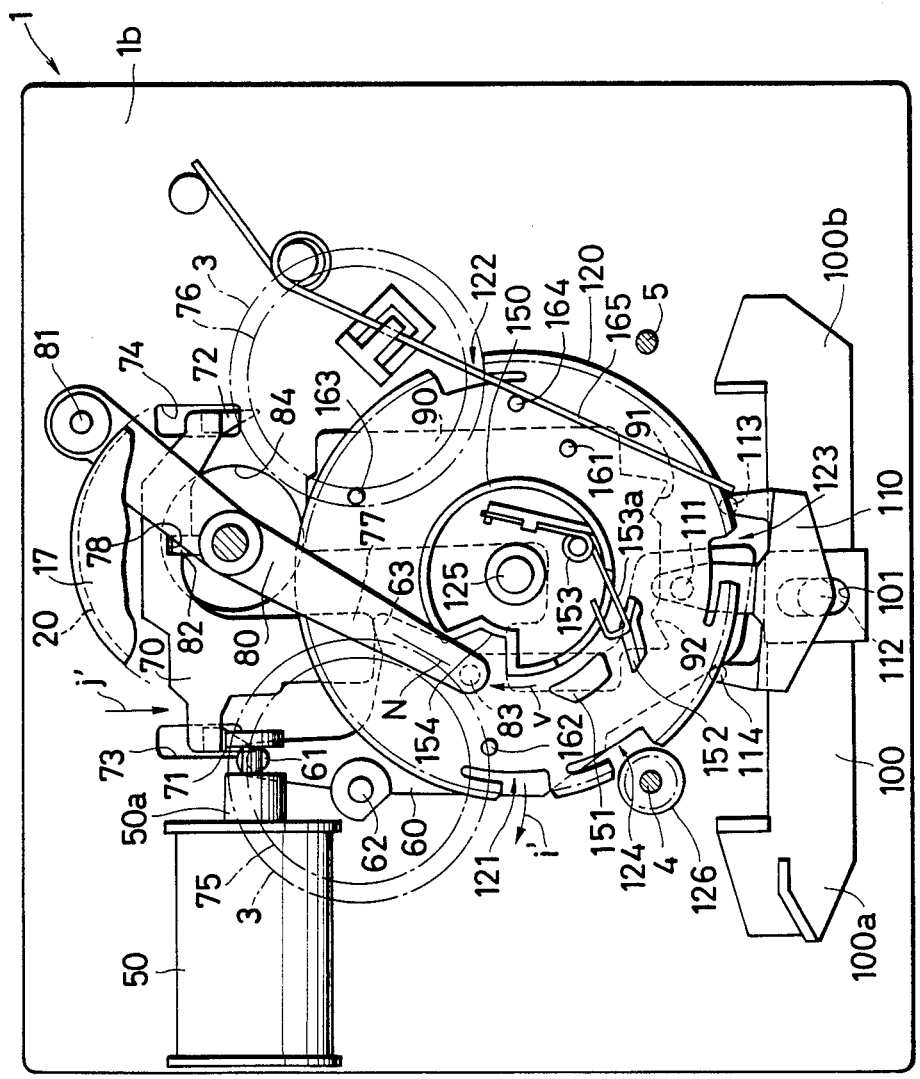
FIG. 15C is a bottom plan view showing the principal elements of the mode-change mechanism of FIG. 15A when the rewind mode has not been selected.

When the rewind mode is not commanded at the branch point C, solenoid 50 is turned "off" and, as shown in FIG. 15C, as brake member 70 has also been moved to the return position in th direction of arrow j' due to the return of regulating lever 60 in the direction of arrow i', change lever 80 has been held in the neutral position N.

Therefore, pin 83 of FR change lever 80 is not inserted in recess 154 of the cam profile of cam 150 but is moved as indicated by arrow v, so that FR driver 31 is engaged with neither idler gear 30 nor reel base gear 23, and as solenoid 50 is "off" locking projection 65 of regulating lever 60 does not abut fourth locking projection 134. Thus, gear 120, which has the cams on both sides, is not locked and the rewind mode is passed.

In the above manner, as represented in FIGS. 3 and 4, the selection of one of the two states, changed or not changed to the rewind mode, is performed at the third branch point C, so that the rewind mode or the state passing the rewind mode, is selectively provided. Thus, if the rewind mode is set as shown in FIG. 3, a rewind mode during "forward", a rewind search mode during "forward," a rewind mode during "reverse", or a rewind search mode during "reverse" will be provided by selecting "forward" or "reverse" at the first branch point A, and by selecting the non-search mode and the search mode at the fourth branch point D.

Upon switching to the fast forward mode or the rewind mode, FR change lever 80 and brake member 70 are each restrained by the help of engagement projection 82 and engagement recess 78. That is, FR change lever 80 is not pivoted unless brake member 70 is moved to the advanced position in the direction of arrow j in FIGS. 14A and 15A.

In other words, after reel bases 2 and 3 are disengaged from brake member 70 in order to be unlocked FR change lever 80, on which FR driver 31 is mounted, becomes free to pivot so that no noise is produced when FR driver 31 is engaged with idler gear 30 or with reel base gear 23.

In addition, in the state where FR change lever 80 is free to pivot, the return of brake member 70 is interrupted by engagement projection 82 on FR change lever 80, so that the situation does not occur in which reel bases 2 and 3 are restrained by brake member 70, while FR change lever 80 is free to pivot.

Furthermore, brake member 70 is not moved to the return position unless FR change lever 80 is returned to the neutral position N where engagement recess 78 of brake member 70 is engaged with engagement projection 82. In other words, reel bases 2 and 3 are engaged with brake member 70, after FR driver 31 is disengaged from idler gear 30 or reel base gear 23, so that no noise is produced when FR driver 31 is disengaged from idler gear 30 or reel base gear 23.

In addition, FR change lever 80 is driven by cam 150 and is pressed by force P caused by the elasticity of belt 20, which is wound around FR pulley 17 of FR change lever 80, so as to make pin 83 of FR change lever 80 resiliently abut against the profile of cam 150, so that belt 20 that transmits rotation of motor 18 to FR driver 31 can also press FR change lever 80. Therefore, a special biasing spring need not be provided for FR change lever 80.

When solenoid 50 is turned "off" during the rewind mode, regulating lever 60 is moved to the return position in the direction of arrow i' in FIG. 15B, and locking projection 65 is disengaged from fourth locking projection 134, fourth spring stop 164 of gear 120 is pressed by coiled torsion spring 165 and gear 120, which is rotated by an initial torque in the direction of arrow o, is engaged with driving gear 126. As a result gear 120 is rotated in the direction of arrow o, and the stop mode is set again upon turning "off" solenoid 50.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A mode change and drive mechanism for reel bases of a tape recorder having a plurality of operating modes, comprising:

movable change lever means to which a driver gear is rotatably affixed, said driver gear selectively engaging with and transmitting a torque to one of a pair of the reel bases;

change-lever controlling means for selectively setting said change lever means to a movable state or a fixed state in response to a mode change;

drive means for driving said change lever means in response to a mode change, whereby said driver gear selectively engages one of said pair of reel bases, or a non-engaged position where said driver is not engaged with either of said pair of reel bases;

reciprocating brake means for engaging said pair of reel bases to prevent rotation of said pair of reel bases;

brake controlling means for controlling said brake means and said change-lever controlling means in response to a mode change; and wherein said change-lever controlling means comprises a first engagement portion formed on said change lever means, and a second engagement portion disposed in said brake means for selective engagement with said first engagement portion of said change lever means.

2. The mechanism for reel bases according to claim 1, wherein said drive means brings said change lever means to said engaged position when said change lever means is in said movable state and, when said change lever means is in said fixed state, brings said change lever means to said non-engaged position.

3. The mechanism for reel bases according to claim 2, wherein said drive means comprises a mode-change cam having a first cam passage for bringing said change lever means to said engaged position, and a second cam passage for bringing said change lever means to said non-engaged position, said change lever means being led to said first cam passage or said second cam passage by rotation of said mode-change cam.

4. The mechanism for reel bases according to claim 3, wherein said mode-change cam is formed integrally with a partially toothless gear having toothless peripheral portions, said partially toothless gear being intermittently rotated by said driving gear driven by a power source in response to a mode change, wherein said toothless portions are located in opposed relation to said driving gear.

5. The mechanism for reel bases according to claim 4, wherein said brake controlling means is driven by a solenoid means for controlling a regulating means for locking rotation of said partially toothless gear, at the time when each of said toothless portions is positioned in opposed relation to said driving gear.

6. A mode-change and drive mechanism for reel bases of a tape recorder having changeable modes of operation, comprising:

movable change lever means to which a driver is rotatably secured, said driver selectively engaging with and transmitting a torque to one of a pair of reel bases;

change-lever controlling means for selectively bringing said change lever means to a movable state or a fixed state in response to a mode change;

a mode change cam having a first cam passage for bringing said change lever means to a first mode position in a first mode, and a second cam passage for bringing said change lever means to a second mode position in a second mode, said change lever means being driven by rotation of said mode change cam; and spring means arranged in a position where said first cam passage and said second cam passage of the mode change cam branch, for causing said change lever means to select one or the other of said two cam passages, whereby when said first mode is selected, said change lever means is set in a movable state by said change-lever controlling means, so as to have said change lever means selectively moved by said spring means to said first cam passage as said mode change cam rotates, and when said second mode is selected, said change lever means is set in a fixed state by said change-lever controlling means, so as to have said change lever means selectively moved by said spring means to said second cam passage as said mode change cam rotates.

7. The mode-change and drive mechanism for reel bases according to claim 6, wherein said change-lever controlling means is controlled by a reciprocating brake means that engages said pair of reel bases and restrains rotation thereof, and by a brake controlling means that controls said brake means in response to the change of modes, whereby when said brake means engages said pair of reel bases and restrains rotation thereof due to the function of said brake controlling means, said change lever means is set in said fixed state, and when the restraint of rotation of said pair of reel bases by said brake means is removed, said change lever means is set in said movable state.

8. The mode-change and drive mechanism for reel bases according to claim 7, wherein said change-lever controlling means comprises a pair of engagement portions disposed in said change lever means and said brake means, respectively, said engagement portion of the brake means being capable of selecting either state, engaged with or disengaged from, of said engagement portion of the change lever means.

9. The mode-change and drive mechanism for reel bases according to claim 6, wherein said mode change cam is formed integrally with a partially toothless gear that is intermittently rotated by a driving gear driven by a power source in response to mode change operations, and toothless portions of which can be located in opposed relation to said driving gear.

10. The mode-change and drive mechanism for reel bases according to claim 9, wherein said brake controlling means is driven by a solenoid operated means which controls a regulating means for locking or unlocking rotation of said partially toothless gear, at a time when each of said toothless portions is positioned in opposed relation to said driving gear.

11. A drive device for a pair of reel bases of a tape recorder having a drive motor, the drive device comprising:

swingable change lever means to which a driver and a rotating wheel are rotatably secured, said driver and said rotating wheel being coaxially arranged, with said rotating wheel transmitting a torque supplied by said drive motor to said driver and said driver selectively transmitting said torque from said drive motor to one of said pair of reel bases;

a mode change cam arranged for rotation by said drive motor in response to a change of modes of said tape recorder and for driving said change lever means;

an elastic belt looped between said rotating wheel and a pulley of said drive motor, so as to transmit said torque of said drive motor to said rotating wheel; and said change lever means being pivotally mounted and including a pin that is pressed against said mode change cam by the elasticity of said elastic belt.

* * * * *